(12) United States Patent
Liu et al.

(10) Patent No.: US 10,859,181 B2
(45) Date of Patent: Dec. 8, 2020

(54) WATER SOFTENER VALVE

(71) Applicants: WUHU MIDEA KITCHEN AND BATH APPLIANCES MFG. CO., LTD., Wuhu (CN); MIDEA GROUP CO., LTD., Foshan (CN)

(72) Inventors: Guohua Liu, Foshan (CN); Zhifeng He, Foshan (CN)

(*) Notice: Subject to any disclaimer, the term of this patent is extended or adjusted under 35 U.S.C. 154(b) by 78 days.

(21) Appl. No.: 16/179,892

(22) Filed: Nov. 3, 2018

(65) Prior Publication Data

US 2019/0072206 A1    Mar. 7, 2019

(30) Foreign Application Priority Data

| Apr. 28, 2018 | (CN) | 2018 1 0413902 |
| Apr. 28, 2018 | (CN) | 2018 1 0413905 |
| Apr. 28, 2018 | (CN) | 2018 1 0413972 |
| Apr. 28, 2018 | (CN) | 2018 2 0649043 U |
| Apr. 28, 2018 | (CN) | 2018 2 0649045 U |
| Apr. 28, 2018 | (CN) | 2018 2 0649120 U |

(51) Int. Cl.
*F16K 5/00* (2006.01)
*B01J 49/85* (2017.01)
(Continued)

(52) U.S. Cl.
CPC ......... *F16K 31/52475* (2013.01); *B01J 49/85* (2017.01); *C02F 1/42* (2013.01);
(Continued)

(58) Field of Classification Search
CPC .. C02F 1/42; C02F 1/5245; C02F 5/00; C02F 2209/40; C02F 2303/16; C02F 2201/005
See application file for complete search history.

(56) References Cited

U.S. PATENT DOCUMENTS

| 6,402,944 B1 * | 6/2002 | Vaughan | C02F 1/42 |
| | | | 137/597 |
| 6,644,349 B2 * | 11/2003 | Scanlan | F16K 11/07 |
| | | | 137/625.48 |

(Continued)

FOREIGN PATENT DOCUMENTS

| CN | 105927758 A | 9/2016 |
| JP | 2002028646 A | 1/2002 |

OTHER PUBLICATIONS

International Search Report dated Jan. 16, 2019 corresponding to International Application No. PCT/CN2018/111144.

*Primary Examiner* — Matthew O Savage
(74) *Attorney, Agent, or Firm* — Kilpatrick Townsend & Stockton, LLP

(57) ABSTRACT

Disclosed is a water softener valve and a water softener, the water softener valve includes a valve body, the valve body includes a valve cavity, and an inlet passage, an outlet passage, and a waste water passage all communicated with the valve cavity, the valve cavity, the inlet passage, the outlet passage, and the waste water passage all extend towards a first direction, the inlet passage, the outlet passage, and the waste water passage are all located at a periphery of the valve cavity, and adjacent to the valve cavity; ends of the inlet passage, the outlet passage, and the waste water passage which are all located at a same end of the valve body towards the first direction respectively form an inlet, an outlet, and a waste water port.

16 Claims, 21 Drawing Sheets

(51) Int. Cl.
    *C02F 1/42*     (2006.01)
    *F16K 31/524*     (2006.01)
    *F16K 31/53*     (2006.01)
    *F16K 31/16*     (2006.01)
    *F16K 27/04*     (2006.01)
    *F16K 11/18*     (2006.01)
    *C02F 1/52*     (2006.01)
    *F16K 11/07*     (2006.01)

(52) U.S. Cl.
    CPC ............ C02F 1/5245 (2013.01); F16K 11/18 (2013.01); F16K 27/041 (2013.01); F16K 31/16 (2013.01); F16K 31/5245 (2013.01); F16K 31/53 (2013.01); *C02F 2201/005* (2013.01); *C02F 2209/40* (2013.01); *C02F 2303/16* (2013.01); *F16K 11/07* (2013.01)

(56) References Cited

U.S. PATENT DOCUMENTS

2007/0262024 A1*   11/2007   Gruett ...................... B01J 49/85
                                                        210/670
2010/0200522 A1*   8/2010   Tischendorf .............. C02F 1/74
                                                        210/798

* cited by examiner

WATER SOFTENER VALVE

CROSS-REFERENCE TO RELATED APPLICATIONS

This application claims a priority to and benefits of Chinese Patent Application Serial No. 201810413902.6, 201820649043.6, 201810413972.1, 201820649120.8, 201810413905.X and 201820649045.5, filed with the State Intellectual Property Office of P. R. China on Apr. 28, 2018, the entire contents of which are incorporated herein by reference.

FIELD

The disclosure generally relates to the technical field of water processing equipment, and more particularly relates to a water softener valve, and a water softener.

BACKGROUND

A water softener can soften the water, thereby improving the user's water quality experience, saving detergent, saving water and so on. A core component of the water softener is water softener valve. Apart from an ion exchange tank and a saline solution tank, the overall size of the water softener is mainly affected by the water softener valve. The current water soften valve has a plurality of ports protruding from the upper end or one side of the valve body of the water softener valve, for example, a drain outlet and a saline solution suction port protrudes from the top end or the side of the valve body, or, forms on a L-shaped pipe. This makes the height or width of the water softener valve be increased, which accordingly would increase the height or width of the water softener to which the water softener valve is applied, and so the whole water softener would need to take up more space.

SUMMARY

The present disclosure provides a water softener valve, which aims to solve the problem that the current water softener valve has a large overall volume, which accordingly would increase the overall volume of the water softener to which the water softener valve is applied.

In one embodiment, the water softener valve provided by the present disclosure includes a valve body, the valve body includes a valve cavity, and an inlet passage, an outlet passage, and a waste water passage all communicated with the valve cavity, the valve cavity, the inlet passage, the outlet passage, and the waste water passage all extend towards a first direction, the inlet passage, the outlet passage, and the waste water passage are all located at a periphery of the valve cavity, and adjacent to the valve cavity; ends of the inlet passage, the outlet passage, and the waste water passage which are all located at a same end of the valve body towards the first direction respectively form an inlet, an outlet, and a waste water port.

Selectively, the valve body further includes a saline solution suction passage communicated with the valve cavity, the saline solution suction passage extends along the first direction and locates at the periphery of the valve cavity, the saline solution suction passage defines a saline solution suction port at the end of the valve body having the inlet, the outlet, and the waste water port.

Selectively, the inlet, the outlet, the waste water port, and the saline solution suction port are all arranged along a second direction, the end of the inlet passage having the inlet, and the end of the outlet passage having the outlet are both protruded from the end of the waste water passage having the waste water port or the end of the saline solution suction passage having the saline solution suction port, the first direction is perpendicular to the second direction.

Selectively, the valve body includes a first end surface paralleling to the second direction, the inlet passage, and the waste water passage are both adjacent to the first end surface;

the first end surface forms a first auxiliary hole and a second auxiliary hole, the water softener valve further includes a first end cover configured to cover the first auxiliary hole and the second auxiliary hole;

the first auxiliary hole communicates with the inlet passage, an inner surface of the inlet passage facing the first auxiliary hole defines a first communicating hole which communicates with the valve cavity; and the second auxiliary hole communicates with the waste water passage, an inner surface of the waste water passage facing the second auxiliary hole defines a second communicating hole which communicates with the valve cavity.

Selectively, the valve body further includes a second end surface paralleling to the second direction, the second end surface faces the first end surface, the outlet passage is adjacent to the second end surface; and the second end surface defines a third auxiliary hole which communicates with the outlet passage, the water softener valve further includes a second end cover configured to cover the third auxiliary hole, an inner surface of the outlet passage facing the third auxiliary hole defines a third communicating hole which communicates with the valve cavity.

Selectively, the saline solution suction passage is adjacent to the second end surface, a guiding passage and an ejecting passage of the valve body are both defined in the second end surface, and extend along the second direction until communicate with the valve cavity, the second end cover defines a connecting passage configured to communicate with external ends of the guiding passage and the ejecting passage.

Selectively, the end of the valve cavity away from the inlet defines a mounting hole, the water softener valve further includes a third end cover configured to cover the mounting hole.

Selectively, the valve body further includes a softening inlet passage and a softening outlet passage which extend along the third direction, ends of the softening inlet passage and the softening outlet passage respectively defines a softening inlet and a softening outlet.

Selectively, the end of the valve body defining the inlet, the outlet, and the waste water port defines a fourth auxiliary hole, the fourth auxiliary hole is located between the waste water passage and the saline solution suction passage;

the fourth auxiliary hole extends along the first direction until communicates with the softening outlet passage, an inner surface of the fourth auxiliary hole defines a fourth communicating port communicated with the valve cavity; the water softener valve further includes a fourth end cover configured to cover the fourth auxiliary hole.

Selectively, the water softener valve further includes a sealing structure, the sealing structure includes a driving component, a sealing plug, and a piston rod located in the saline solution suction passage of the water softener valve, one end of the piston rod is connected with the driving component, the other end of the piston rod is fixedly connected with the sealing plug; a shape of an outer surface of the sealing plug matches with a shape of the saline solution suction port, and the outer surface of the sealing plug is attached with a wall surface of the saline solution suction port; the driving component drives the piston rod to reciprocate, to allow the sealing plug to seal or open the saline solution suction port.

Selectively, the side of the sealing plug facing the saline solution suction port defines a guiding bevel, the saline solution suction port defines a chamfered surface corresponding to the guiding bevel, a slanting angle of the guiding bevel equates to the slanting angle of the chamfered surface, the guiding bevel resists on the chamfered surface.

Selectively, the sealing plug is clamped with the piston rod.

Selectively, the side of the sealing plug facing the piston rod defines a first groove, the piston rod is clamped in the first groove.

Selectively, the end of the piston rod adjacent to the sealing plug defines a second groove; a wall of the first groove is defined with a protrusion protruding towards the piston rod, a shape of the protrusion matches with a shape of the second groove, and the protrusion is clamped in the second groove.

Selectively, the water softener valve further includes a ejector, the ejector includes:

an inlet part, the inlet part defines an inlet hole;

an outlet part, the outlet part defines an outlet hole, the outlet hole and the inlet hole are coaxing, an aperture of the inlet hole is smaller than an aperture of the outlet hole, a free end of the outlet part defines a sealing part which sealing matches with a sealing ring of the water softener valve, the sealing part is detachably connected with the sealing ring; and a connecting part, the inlet part and the outlet part are respectively defined at two opposites ends of the connecting part, the connecting part defines a saline solution suction hole, the inlet hole communicates with the outlet hole through the saline solution suction hole.

Selectively, a free end of the outlet part also defines the sealing part.

Selectively, the sealing part is gradually tapered along a direction away from the connecting part; or, the sealing part is an opening formed on a free end of the ejector, the opening matches with the sealing ring.

Selectively, the inlet part, the outlet part, and the connecting part are integrated together.

Selectively, the inlet hole is a taper hole which is gradually tapered along a direction towards the connecting part.

The present disclosure also provides a water softener, which includes an ion exchange tank, and a saline solution tank, the water softener further includes a water softener valve, the water softener valve includes a valve body, the valve body includes a valve cavity, and an inlet passage, an outlet passage, and a waste water passage all communicated with the valve cavity, the valve cavity, the inlet passage, the outlet passage, and the waste water passage all extend towards a first direction, the inlet passage, the outlet passage, and the waste water passage are all located at a periphery of the valve cavity, and adjacent to the valve cavity; ends of the inlet passage, the outlet passage, and the waste water passage which are all located at a same end of the valve body towards the first direction respectively form an inlet, an outlet, and a waste water port.

The present disclosure optimizes the arrangement of the inlet passage, the outlet passage, and the waste water passage of the water softener valve, to define the inlet passage, the outlet passage, and the waste water passage at the periphery of the valve cavity, the inlet passage, the outlet passage, and the waste water passage are all adjacent to the valve cavity. The inlet, the outlet, and the waste water port are all formed on a same end of the valve body, such that the water can be guided to the end of the valve body, or the water can be guided into the valve cavity from the end of the valve body, therefore, the arrangement of the interfaces are much more orderly, the structure of the water softener valve is compacter. When the water softener valve is applied in the water softener, the dimension of the water softener can be much smaller.

BRIEF DESCRIPTION OF THE DRAWINGS

To better illustrate the technical solutions that are reflected in various embodiments according to this disclosure, the accompanying drawings intended for the description of the embodiments herein will now be briefly described, it is evident that the accompanying drawings listed in the following description show merely some embodiments according to this disclosure.

FIG. 4 is an exploded diagram of a part of water softener valve shown in

FIG. 3;

Labels illustration for drawings:

Figure 1:
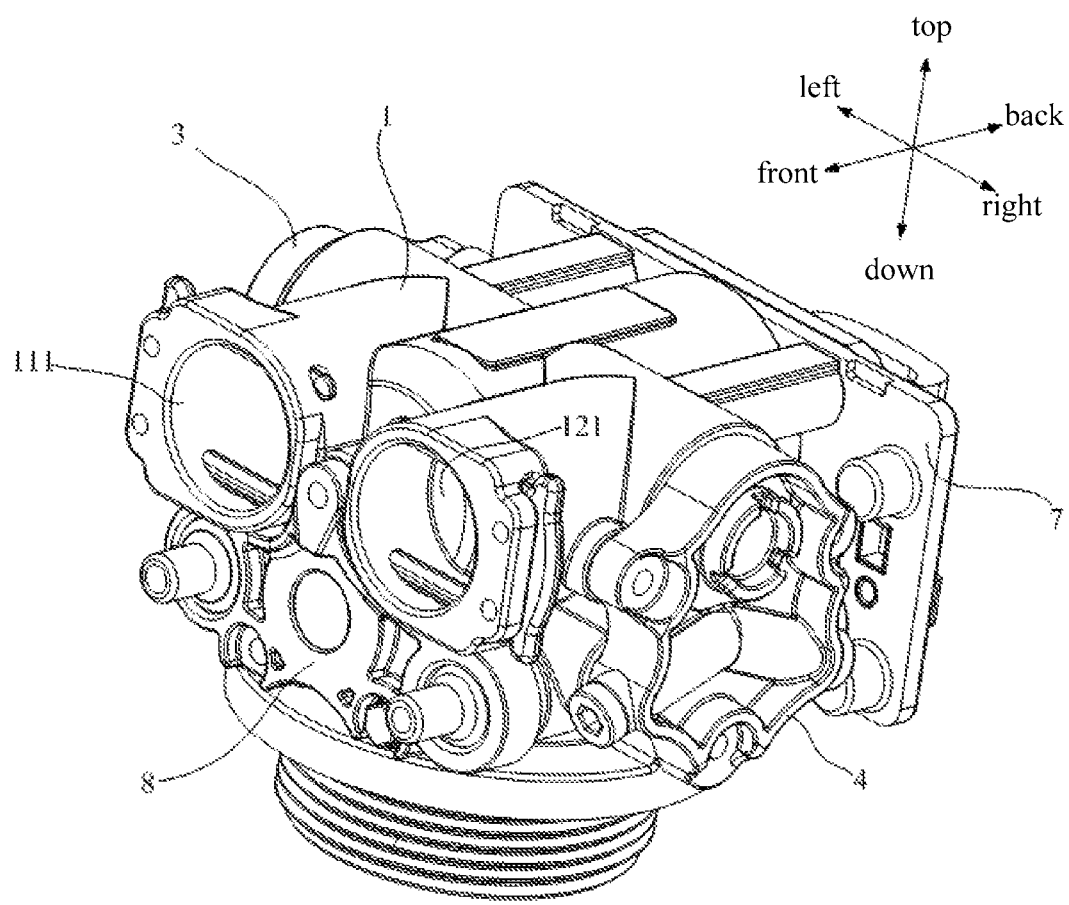
FIG. 1 is a structure diagram of the water softener valve according to an exemplary embodiment of the present disclosure.

| Label | Name | Label | Name |
|---|---|---|---|
| 1 | valve body | 3 | first end cover |
| 10 | valve cavity | 4 | second end cover |
| 101 | mounting port | 41 | connecting passage |
| 11 | inlet passage | 5 | ejector |
| 111 | inlet | 61 | long plug |
| 112 | first communicating hole | 62 | short plug |
| 12 | outlet passage | 7 | third cover |
| 121 | outlet | 8 | fourth end cover |
| 122 | third communicating hole | 100 | driving component |
| 13 | waste water passage | 110 | driving motor |
| 131 | waste water port | 120 | cam |
| 132 | second communicating hole | 200 | piston rod |
| 14 | saline solution suction passage | 210 | second groove |
| 141 | saline solution suction port | 300 | sealing plug |
| 15 | first end surface | 310 | guiding bevel |
| 151 | first auxiliary hole | 320 | first groove |
| 152 | second auxiliary hole | 321 | protrusion |
| 16 | second end surface | 510 | inlet part |
| 161 | third auxiliary hole | 511 | inlet hole |
| 17 | guiding passage | 520 | outlet part |
| 18 | ejecting passage | 521 | outlet hole |
| 19 | softening inlet passage | 522 | lug |
| 191 | softening inlet | 530 | connecting part |
| 20 | softening outlet passage | 531 | saline solution suction hole |
| 201 | softening outlet | 540 | sealing part |
| 21 | fourth auxiliary hole | 550 | saline solution suction groove |
| 211 | fourth communicating port | 9 | sealing ring |
| 2 | spool component | | |

Embodiments of the present disclosure are further described specifically with reference to the accompanying drawings and embodiments.

DETAILED DESCRIPTION

The technical solutions of the embodiments of the present disclosure will be clearly and completely described in the following with reference to the accompanying drawings.

It is to be understood that, all of the directional instructions in the exemplary embodiments of the present disclosure (such as top, down, left, right, front, back . . . ) can only be used for explaining relative position relations, moving condition of the elements under a special form (referring to figures), and so on, if the special form changes, the directional instructions changes accordingly.

The present disclosure provides a water softener valve.

In the exemplary embodiment of the present disclosure, referring to FIGS. 1, 2, 7, 11-15, the water softener valve includes a valve body 1, the valve body 1 includes a valve cavity 10, and an inlet passage 11, an outlet passage 12, and a waste water passage 13 all communicated with the valve cavity 10; the valve cavity 10, the inlet passage 11, the outlet passage 12, and the waste water passage 13 all extend towards a first direction, the inlet passage 11, the outlet passage 12, and the waste water passage 13 are all located at a periphery of the valve cavity 10, and adjacent to the valve cavity 10; ends of the inlet passage 11, the outlet passage 12, and the waste water passage 13 which are all located at a same end of the valve body 1 towards the first direction respectively form an inlet 111, an outlet 121, and a waste water port 131.

In the exemplary embodiment, multiple parts can be fixed together by bolts to form the valve body 1, the corresponding matching surfaces are tightly connected with each other through a sealing structure, such as, a sealing ring, etc. In order to adapt the requirement of the mass production, the parts can be integrated together by injection. In addition, multiple parts can be fixed together through an ultrasonic welding process to form the valve body 1 with a complex valve cavity 10 and multiple passages. Furthermore, the valve body 1 can be formed by an emerging 3D printing technology to adapt the requirement of the small batch production.

The inlet passage 11 is configured to guide water into the valve cavity 10, a spool component of the water softener valve is configured to guide the water in the valve cavity 10 into corresponding passage or connecting port, to realize saline solution intaking and forward washing, saline solution intaking and backwashing, water supplementing, softening, etc. The waste passage 13 is configured to let the waste water generated through the saline solution intaking and forward washing process and saline solution intaking and backwashing process flow out the valve cavity 10.

The inlet 111, the outlet 121, and the waste water port 131 can be formed at either end of the cavity body 1. In order to adapt an ion exchange tank configured to mount the water softener valve at the water softener, in the exemplary embodiment, the first direction corresponds to the forward-backward direction, the inlet 111, the outlet 121, and the waste water port 131 are all formed at the front end of the valve body 1.

The present disclosure optimizes the arrangement of the inlet passage 11, the outlet passage 12, and the waste water passage 13 of the water softener valve, to define the inlet passage 11, the outlet passage 12, and the waste water passage 13 at the periphery of the valve cavity 10, the inlet passage 11, the outlet passage 12, and the waste water passage 13 are all adjacent to the valve cavity 10. The inlet 111, the outlet 121, and the waste water port 131 are all formed on a same end of the valve body 1, such that the water can be guided to the end of the valve body 1, or the water can be guided into the valve cavity 10 from the end of the valve body 1, therefore, the arrangement of the interfaces are much more orderly, the structure of the water softener valve is compacter. When the water softener valve is applied in the water softener, the dimension of the water softener can be much smaller.

Furthermore, referring to FIGS. 5-10, and 16-17, the valve body 1 also includes a saline solution suction passage 14 communicated with the valve cavity 10, the saline solution suction passage 14 extends along the first direction and locates at the periphery of the valve cavity 10, the saline solution suction passage 14 defines a saline solution suction port 141 formed at the end of the valve body 1 having the inlet 111, the outlet 121, and the waste water port 131. The saline solution suction passage 14 is configured to suck the saline solution into the valve cavity 10, or configured to guide the water in the valve cavity 10 flow to a saline solution tank of the water softener under the allocation of the spool component.

In the exemplary embodiment, the saline solution suction passage 14 is adjacent to the periphery of the valve cavity 10 to reduce the volume of the water softener, that is, the structure of the water softener is much more compacter. In detail, when the valve cavity 10 has an barrel structure, the valve body 1 has two opposite end surfaces which parallels to the axis of the valve cavity 10, a shape of a cross section of a main part of the saline solution suction passage 14 matches with a space between the barrel of the valve cavity 10 and one end surface adjacent to the barrel, similarly, the shapes of passages with large flow area, such as, the shape of the inlet passage 11, the shape of the outlet passage 12, and the shape of the waste water passage 13, are also configured to match with the space between the barrel of the valve cavity 10 and the end surface adjacent to the barrel.

The saline solution suction port 141, the inlet 111, the outlet 121, and the waste water 131 are all defined at the same end of the water softener, as such the pipes connected with the water softener can be arranged in order, to reduce the volume of the water softener applied the water softener valve.

In addition, in order to control the opening and closing the saline solution suction passage 14, the saline solution suction passage 14 runs through two ends of the valve body 1 along the first direction, the piston component is movably received in the saline solution suction passage 14, the piston rod of the piston component is exposed from an end of the saline solution suction passage 14 away from the saline solution suction port 141, therefore, the piston rod can be conveniently connected the driving component, or can be manually operated by user.

Figure 2:
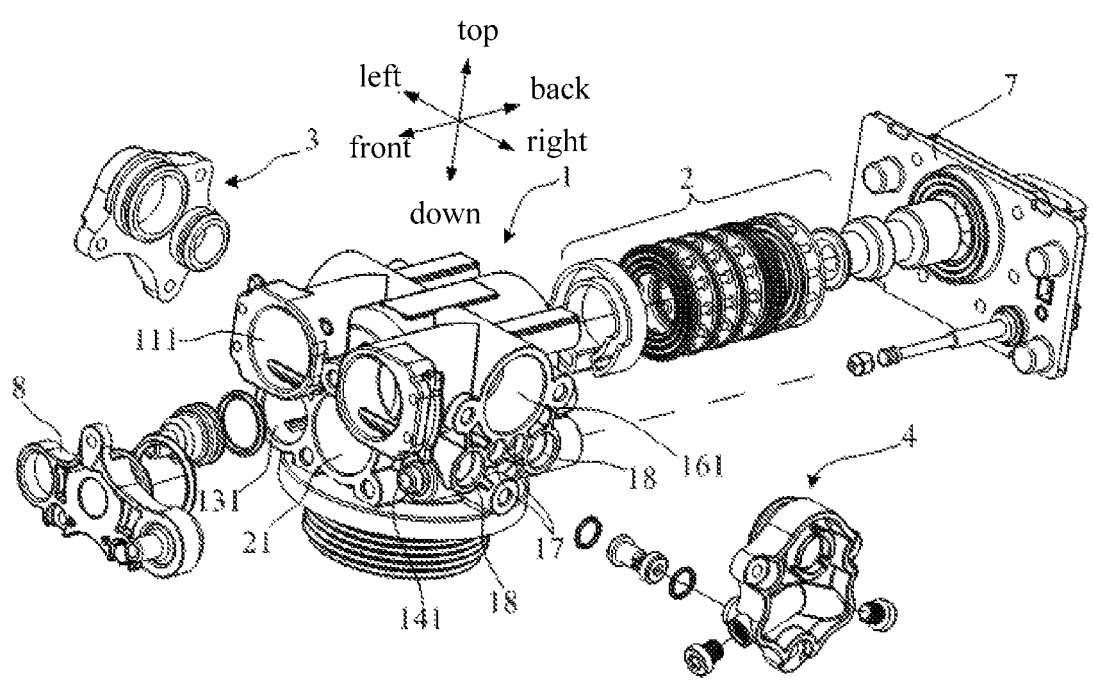
FIG. 2 is an exploded diagram of a part of water softener valve shown in FIG. 1.
Figure 3:
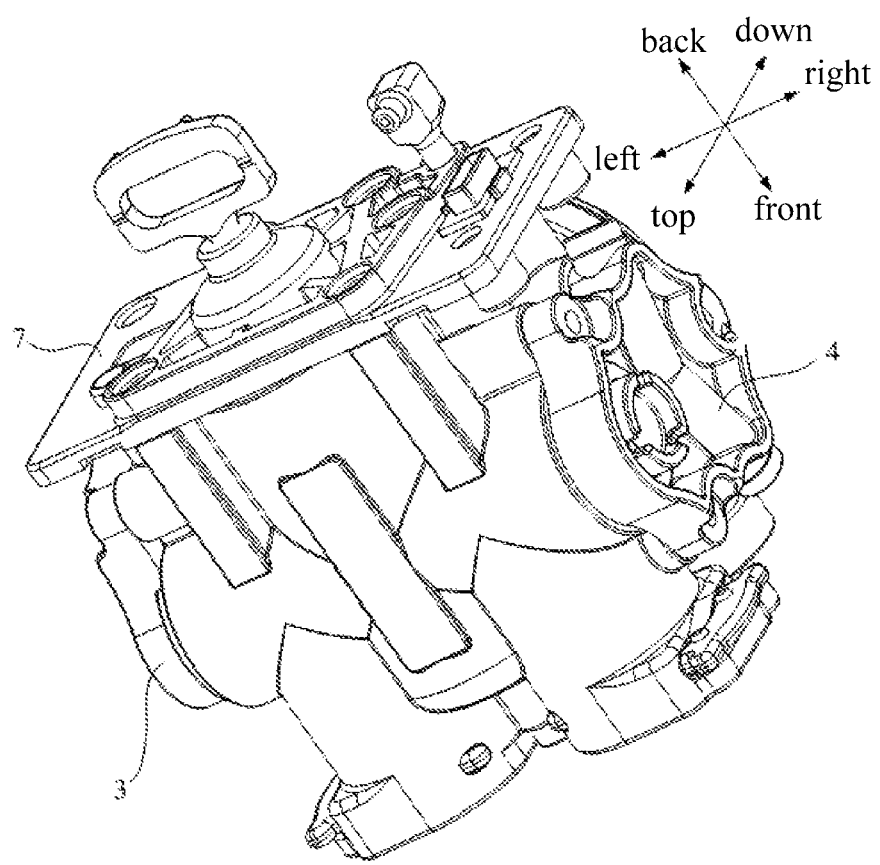
FIG. 3 is a view similar to FIG. 1, while taken from a different aspect.
Figure 4:
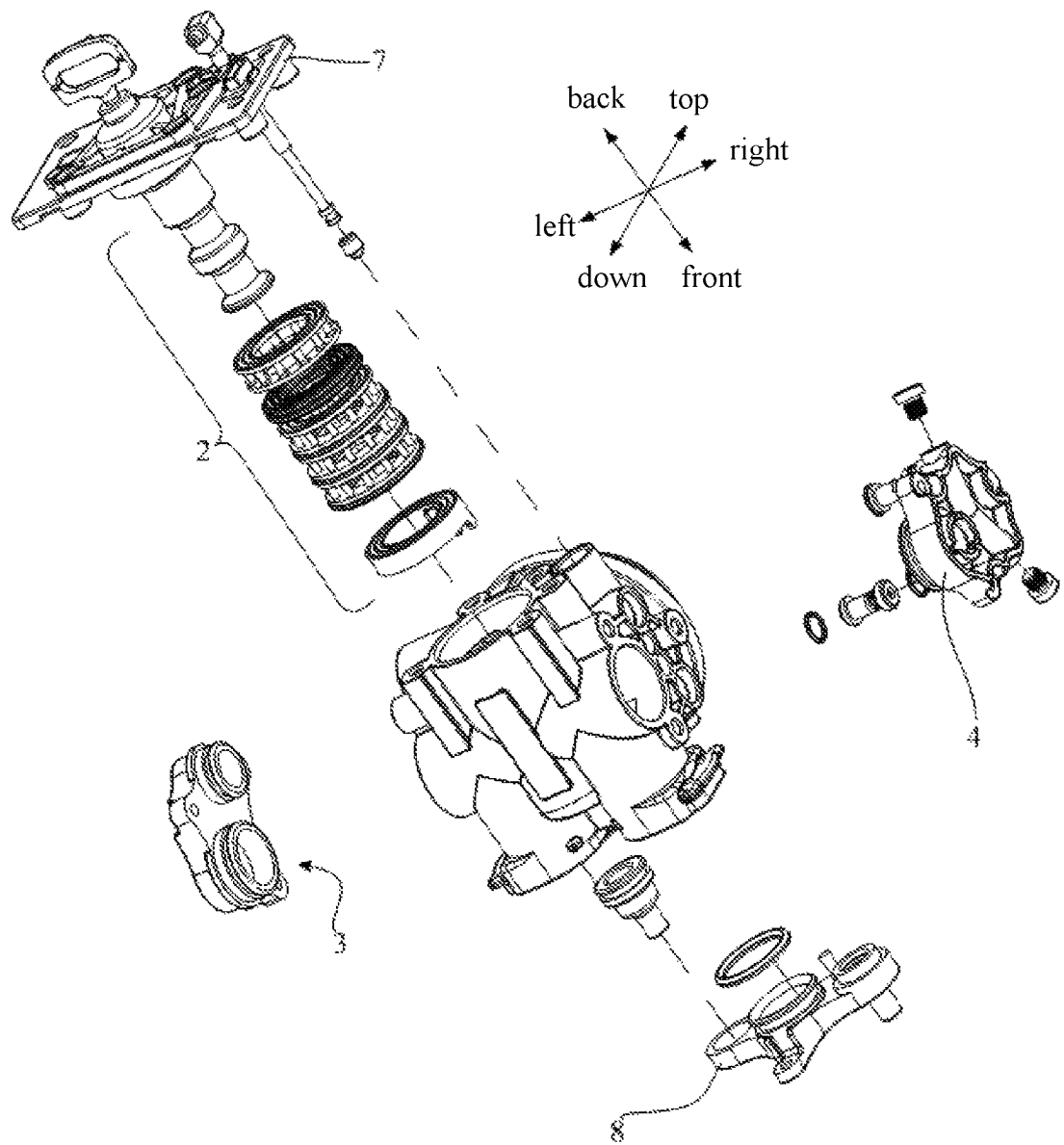
Figure 5:
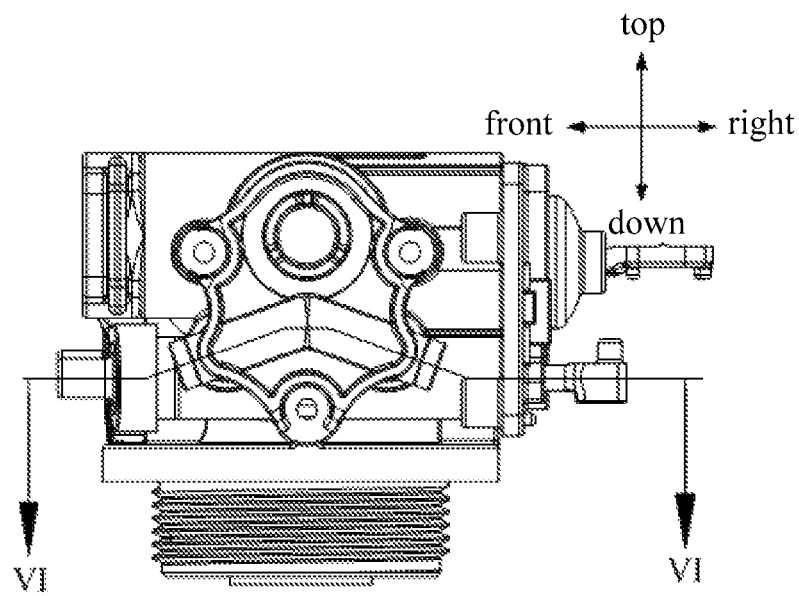
FIG. 5 is a right side elevation view of the water softener valve shown in FIG. 1.
Figure 6:
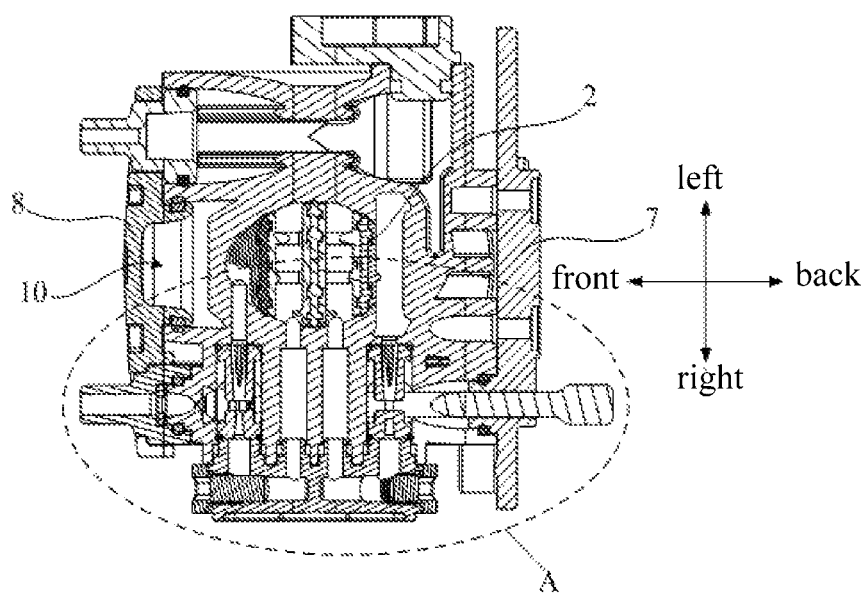
FIG. 6 is a cross section diagram along the line VI-VI shown in FIG. 5.
Figure 11:
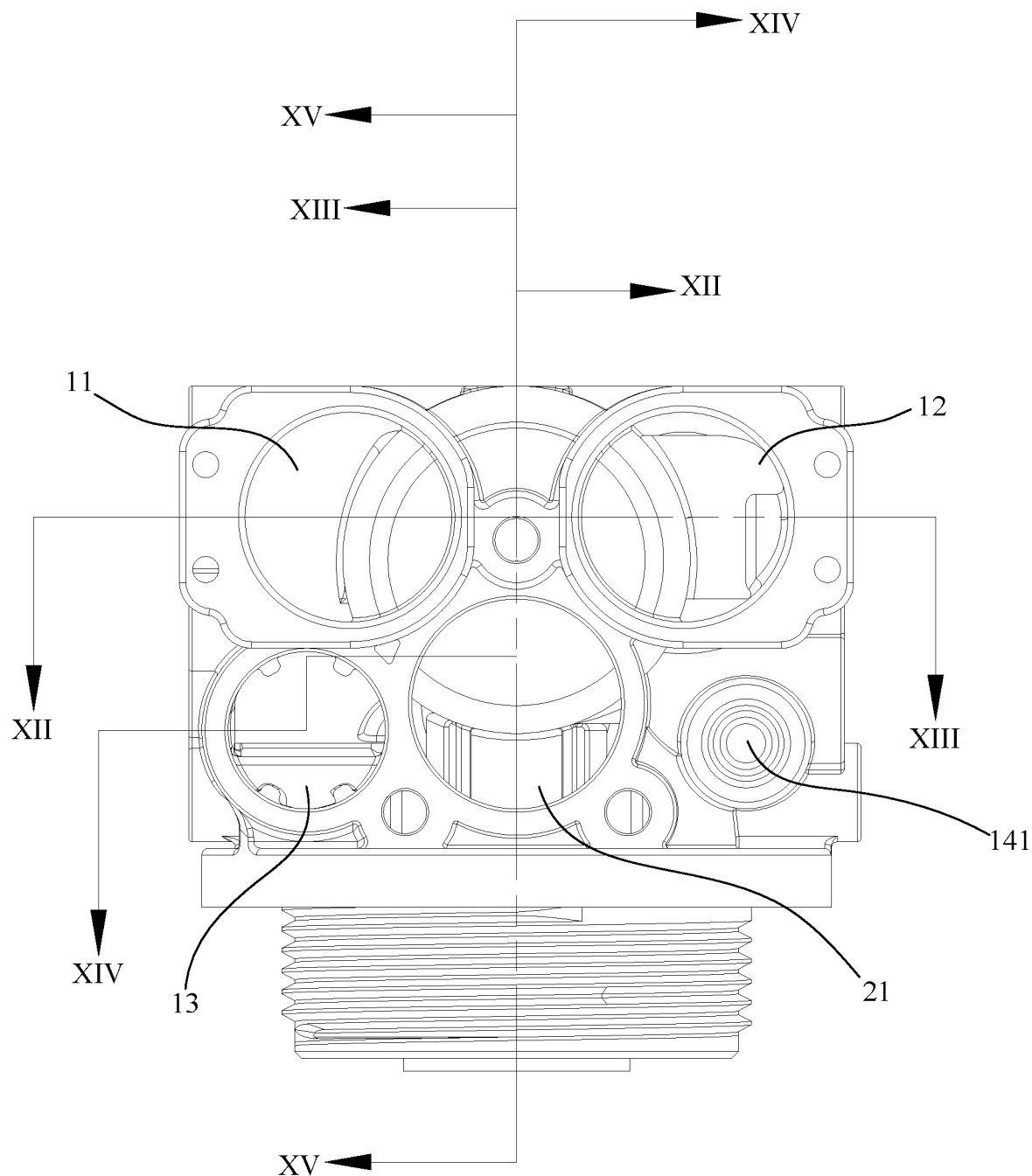
FIG. 11 is a front elevation view of the water softener valve shown in FIG. 1.
Figure 12:
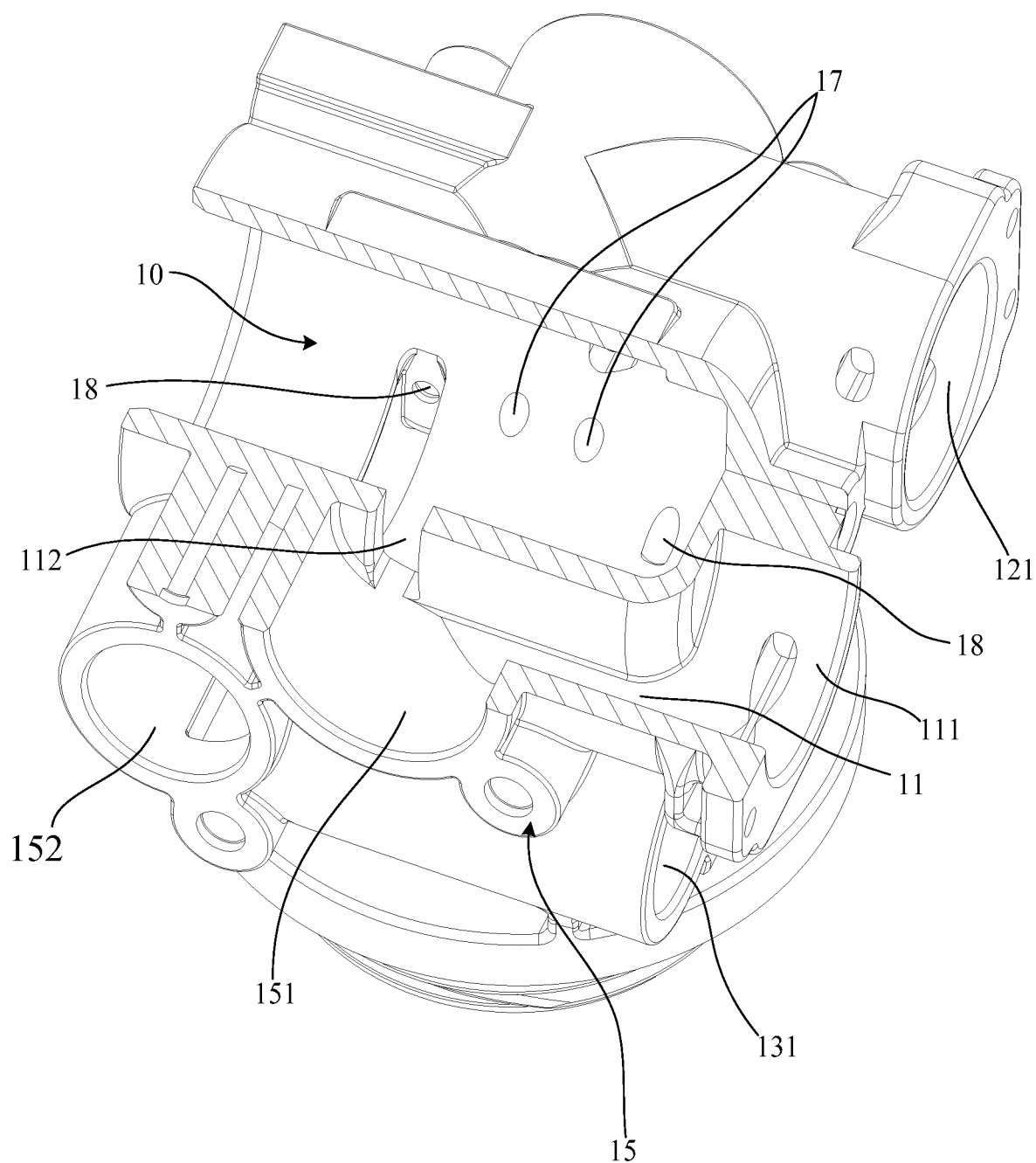
FIG. 12 is a cross section diagram along the line XII-XII shown in FIG. 11.
Figure 13:
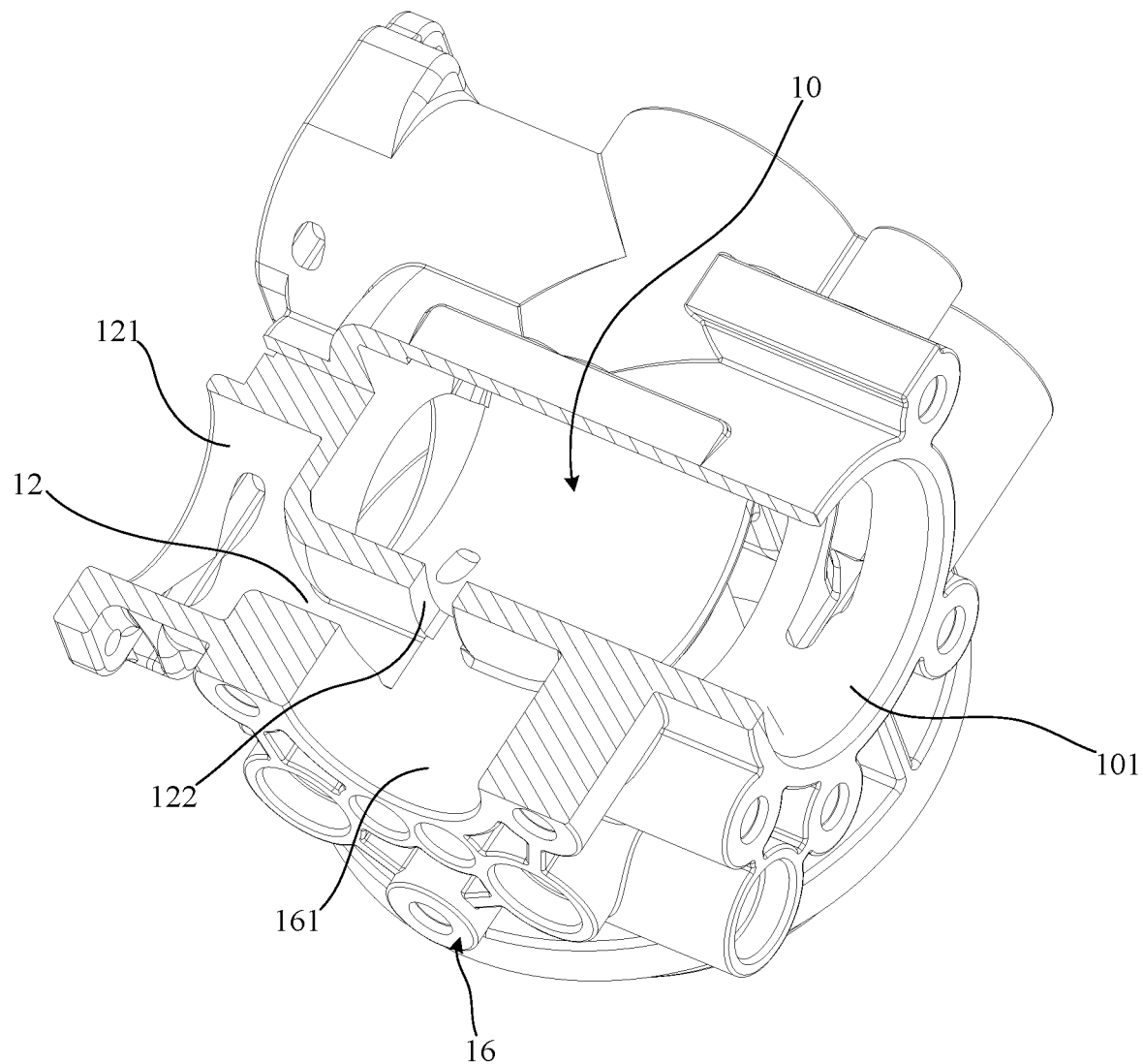
FIG. 13 is a cross section diagram along the line XIII-XIII shown in FIG. 11.
Figure 14:
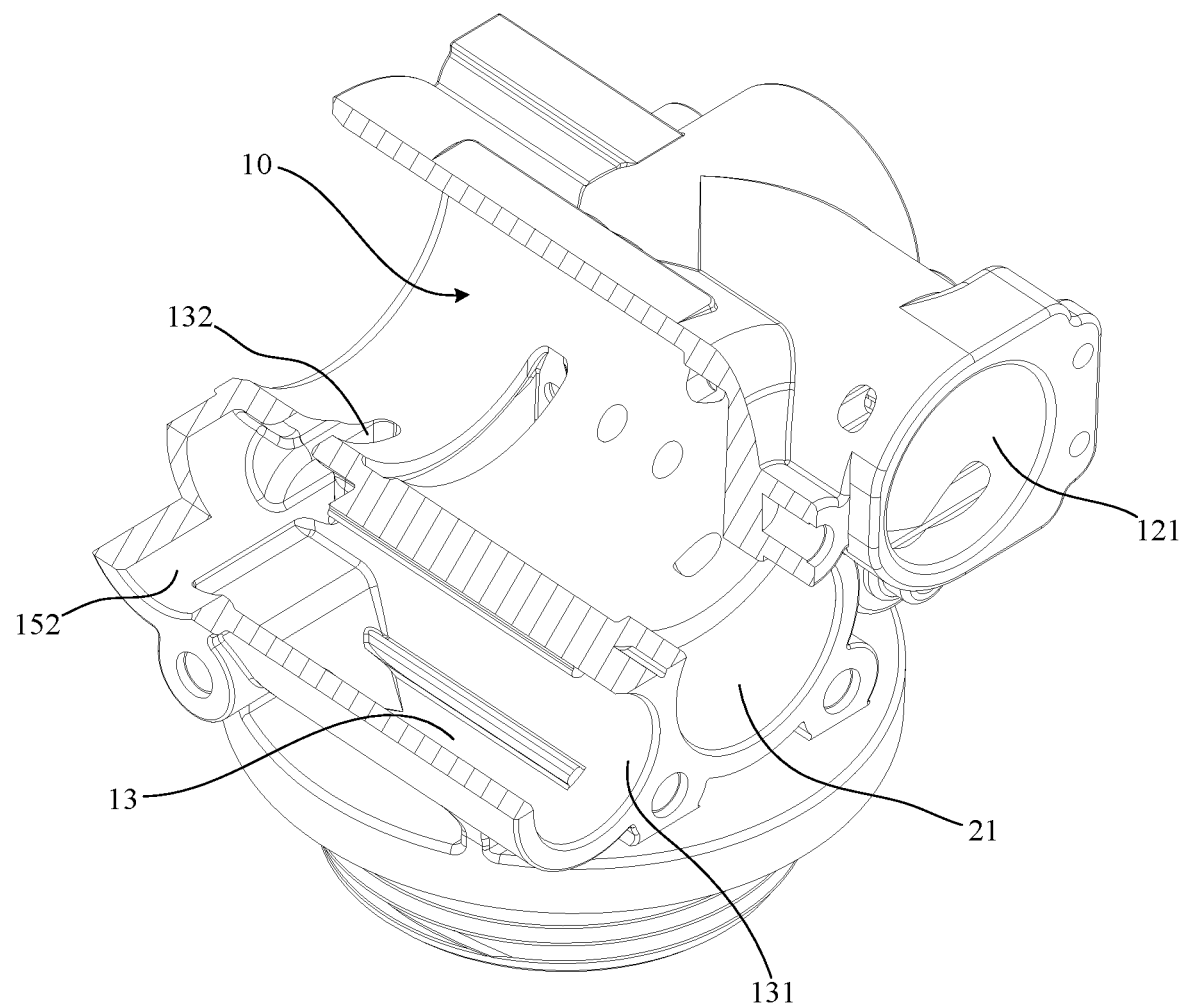
FIG. 14 is a cross section diagram along the line XIV-XIV shown in FIG. 11.
Figure 15:
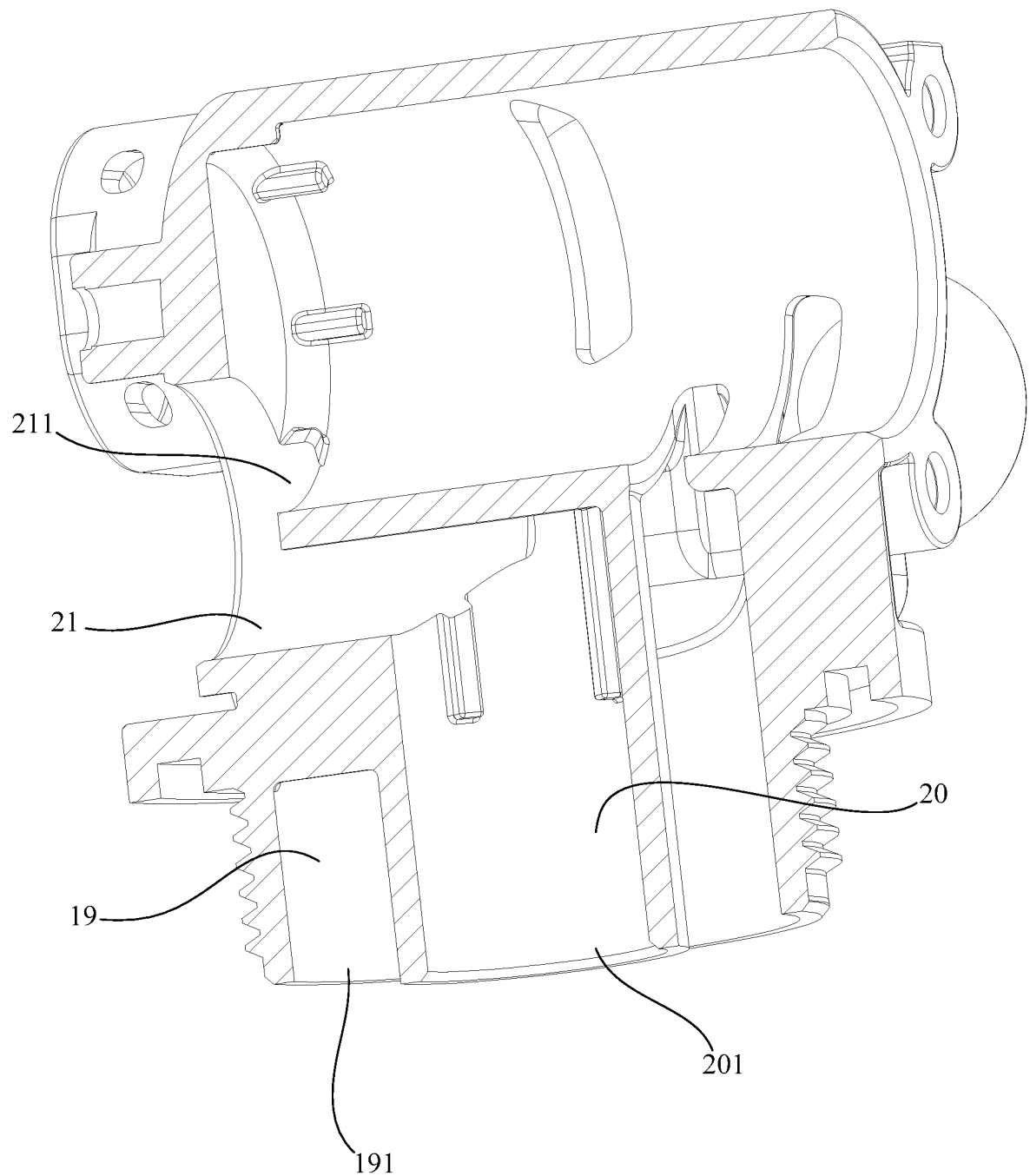
FIG. 15 is a cross section diagram along the line XV-XV shown in FIG. 11.
Figure 16:
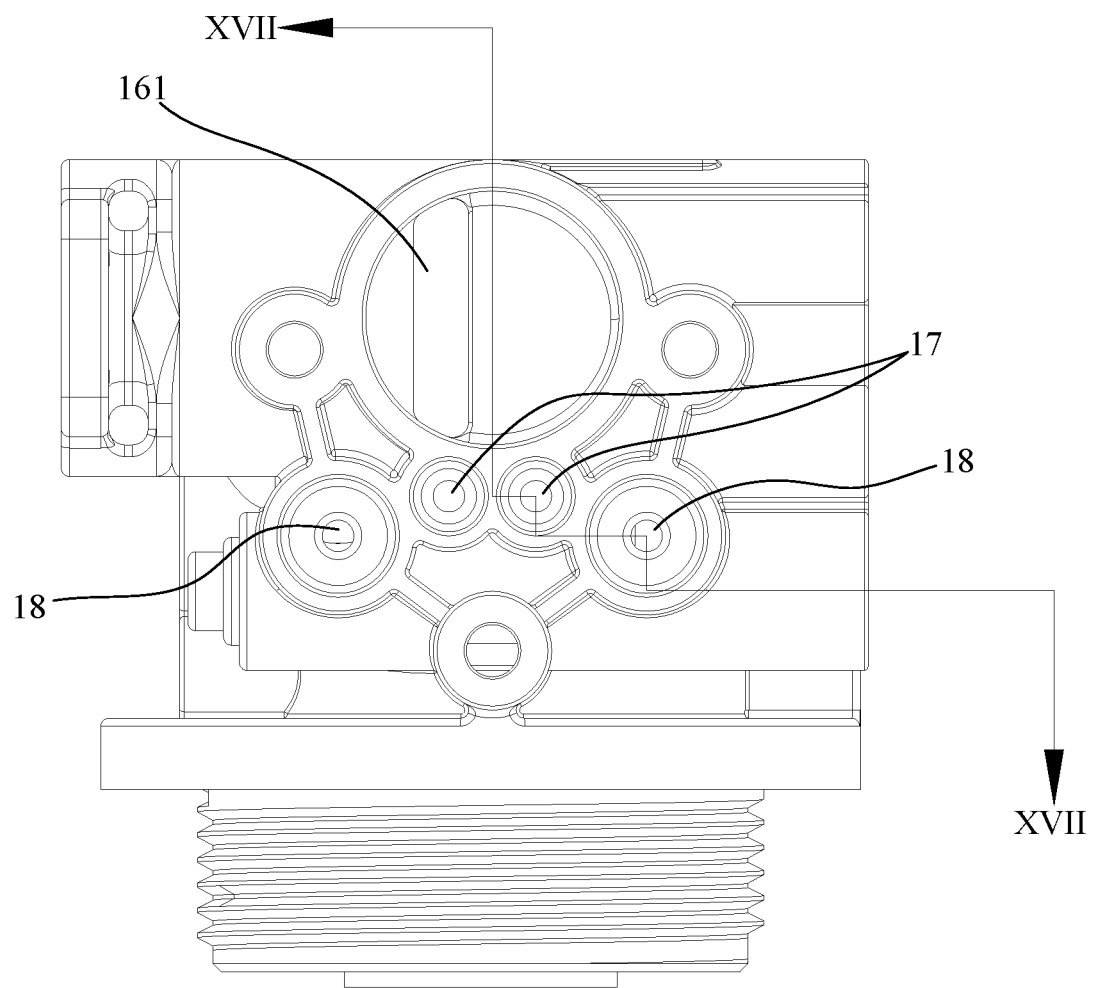
FIG. 16 is a right side elevation view of the water softener valve shown in FIG. 1.
Figure 17:
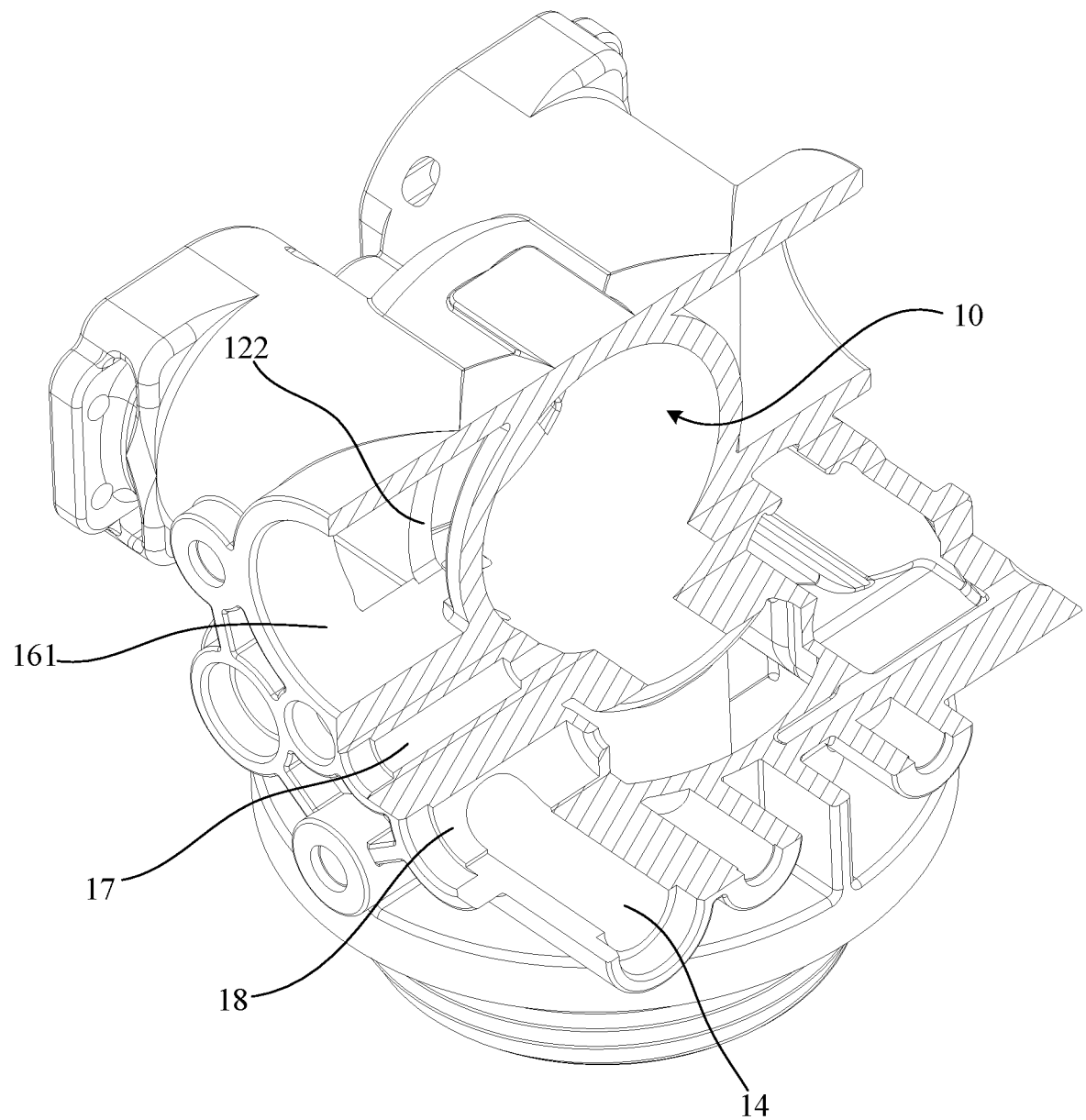
FIG. 17 is a cross section diagram along the line XVII-XVII shown in FIG. 16.

Furthermore, referring to FIGS. 1, 2, and 11, the inlet 111, the outlet 121, the waste water port 131, and the saline solution suction port 141 are all arranged along a second direction, and the end of the inlet passage 11 having the inlet 111, and the end of the outlet passage 12 having the outlet 121 are both protruded from the end of the waste water passage 13 having the waste water port 131 or the end of the saline solution suction passage 14 having the saline solution suction port 141, the first direction, the second direction, and the third direction are perpendicular to each other.

In the exemplary embodiment, the inlet 111, the outlet 121, the waste water port 131, and the saline solution suction port 141 are defined side-by-side along the second direction, as such a boundary dimension of the water softener valve along the third direction can be reduced. That is, when the second direction is consistent with the left-right direction, and the third direction is consistent with the up-down direction, the height of the water softener valve is reduced.

Furthermore, referring to FIGS. 1-4, 11, 12, and 14, the valve body 1 includes a first end surface 15 perpendicular to the second direction, the inlet passage 11, and the waste water passage 13 are both adjacent to the first end surface 15.

the first end surface 15 defines a first auxiliary hole 151, and a second auxiliary hole 152, the water softener valve further includes a first end cover 3 configured to cover the first auxiliary hole 151 and the second auxiliary hole 152;

the first auxiliary hole 151 communicates with the inlet passage 11, an inner surface of the inlet passage 11 facing the first auxiliary hole 151 defines a first communicating hole 112 communicated with the valve cavity 10; and the second auxiliary hole 152 communicates with the waste water passage 13, an inner surface of the waste water passage 13 facing the second auxiliary hole 152 defines a second communicating hole 132 communicated with the valve cavity 10.

In the exemplary embodiment, the inlet passage 11 and the waste water passage 13 are not only adjacent to the first end surface 15, but also are adjacent to the valve cavity 10, to make the inner structure of the valve body 1 compacter.

Selectively, the first end surface 15 is perpendicular to the second direction. When the valve cavity 10 has the barrel structure, cross sections of the inlet passage 11 and the waste water passage 13 are abnormity.

The first auxiliary hole 151 can be configured to match with the first connecting hole 112 formed in a drafting process in injection molding, similarity, the second auxiliary hole 152 can be configured to match with the second connecting hole 132 formed in the mold drafting process in injection molding.

When the valve cavity 10 has the barrel structure, selectively, the first connecting hole 112 is a strip shaped hole which extends along a circumferential direction of the inner surface of the valve cavity 10, the second connecting hole 132 is also a strip shaped hole.

In order to utilize the space of the first end surface 15 of the valve body 1 much better, the center of the first auxiliary hole 151, and the center of the second auxiliary hole 152 are staggered with each other in the first direction and the third direction.

The first auxiliary hole 151, and the second auxiliary hole 152 are covered by the first end cover 3, as such water can flow into the valve cavity 10 through the inlet passage 11, and flow out the valve cavity 10 through the waste water passage 13 without leaking. The sealing ring is located between the matching surfaces of the first end cover 3 and the valve body 1 to increase the sealing effect.

Furthermore, referring to FIGS. 1-4, 11, and 13, the valve body 1 further includes a second end surface 16 perpendicular to the second direction, the second end surface 16 faces the first end surface 15, the outlet passage 12 is adjacent to the second end surface 16.

The second end surface 16 defines a third auxiliary hole 161 which communicates with the outlet passage 12, the water softener valve further includes a second end cover 4 configured to cover the third auxiliary hole 161, an inner surface of the outlet passage 12 facing the third auxiliary hole 161 defines a third communicating hole 122 which communicates with the valve cavity 19.

In the exemplary embodiment, similarly, the outlet passage 12 is not only adjacent to the second end surface 16, but also is adjacent to the valve cavity 10, to make the inner structure of the valve body 1 compacter. Selectively, the second end surface 16 is perpendicular to the second direction. When the valve cavity 10 has the barrel structure, a cross sections of the outlet passage 12 is abnormity.

The third auxiliary hole 161 is avoided from the first auxiliary hole 151 and the second auxiliary hole 152, and the third auxiliary hole 161 is formed on the second end surface 16, so the using of the space of the valve body 1 is much more reasonable use, to reduce the size of the valve body 1.

The third auxiliary hole 161 is covered by the second end cover 4, as such water can flow out the valve cavity 10 through the outlet passage 12 without leaking. The sealing ring is located between the matching surfaces of the second end cover 4 and the valve body 1 to increase the sealing effect.

Furthermore, referring to FIGS. 5-10, and 16-17, the saline solution suction passage 14 is adjacent to the second end surface 16, a guiding passage 17 and an ejecting passage 18 of the valve body 1 are both defined in the second end surface 16, and extend along the second direction until communicate with the cavity 10, the second end cover 4 defines a connecting passage 41 configured to communicate with external ends of the guiding passage 17 and the ejecting passage 18.

In the exemplary embodiment, in the saline solution intaking and regenerating process, water in the valve cavity 10 flows into the one end of the connecting passage 41 through the guiding passage 17, the other end of the connecting passage 41 communicates with an ejecting hole of the ejecting passage 18, to draw the saline solution in the saline solution suction passage 14. The guiding passage 17 and the ejecting passage 18 both include an interface which can be connected to the second end cover 4, to simple the manufacturing process of the flow passages. For example, the guiding passage 17 and the ejecting passage 18 are formed through an unidirectional drafting process, the second end cover 4 can be manufactured through a separate process, the connecting passage 41 can have a U shape, and can be manufactured through the bidirectional drafting process.

In order to utilize the space of the second end surface 16 of the valve body 1 much better, the guiding passage 17 and the ejecting passage 18 are located at the periphery of the third auxiliary hole 161 and adjacent to the third auxiliary hole 161.

Figure 7:
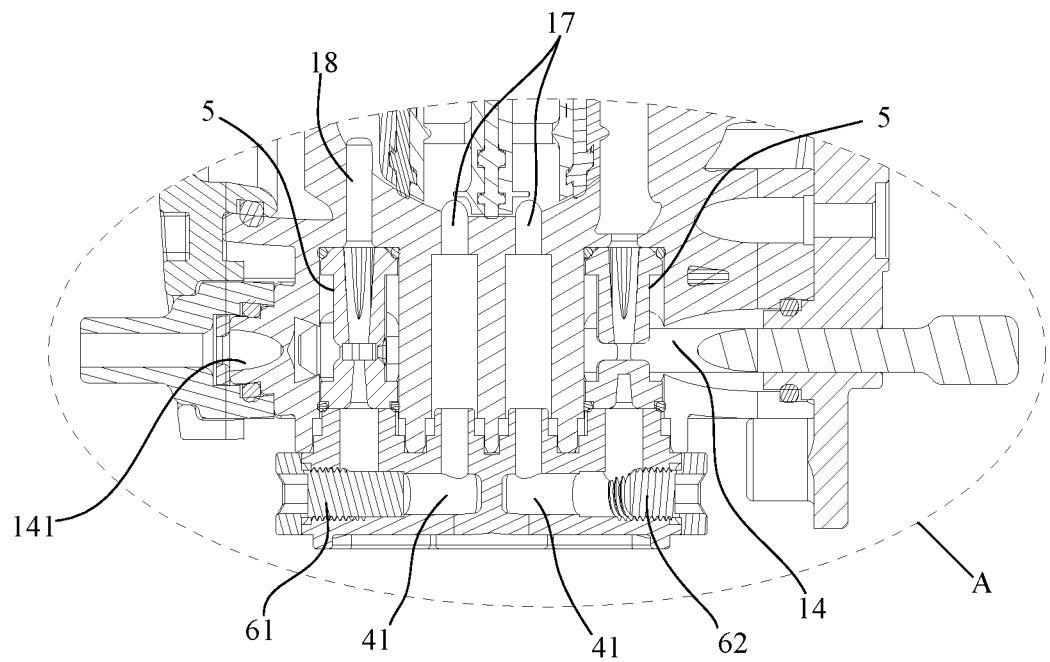
FIG. 7 is an exploded diagram of the portion A shown in FIG. 6.
Figure 8:
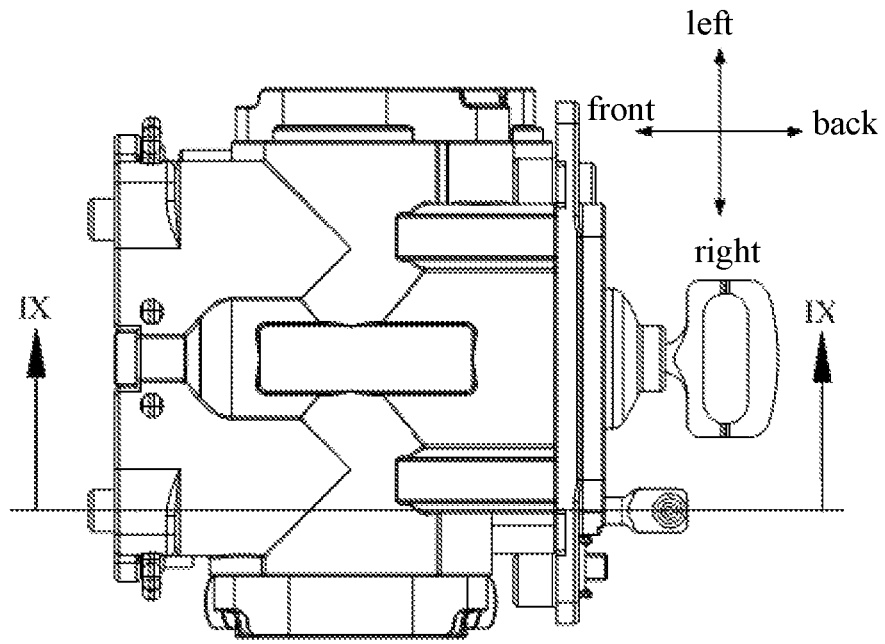
FIG. 8 is a top plan view of the water softener valve shown in FIG. 1.
Figure 9:
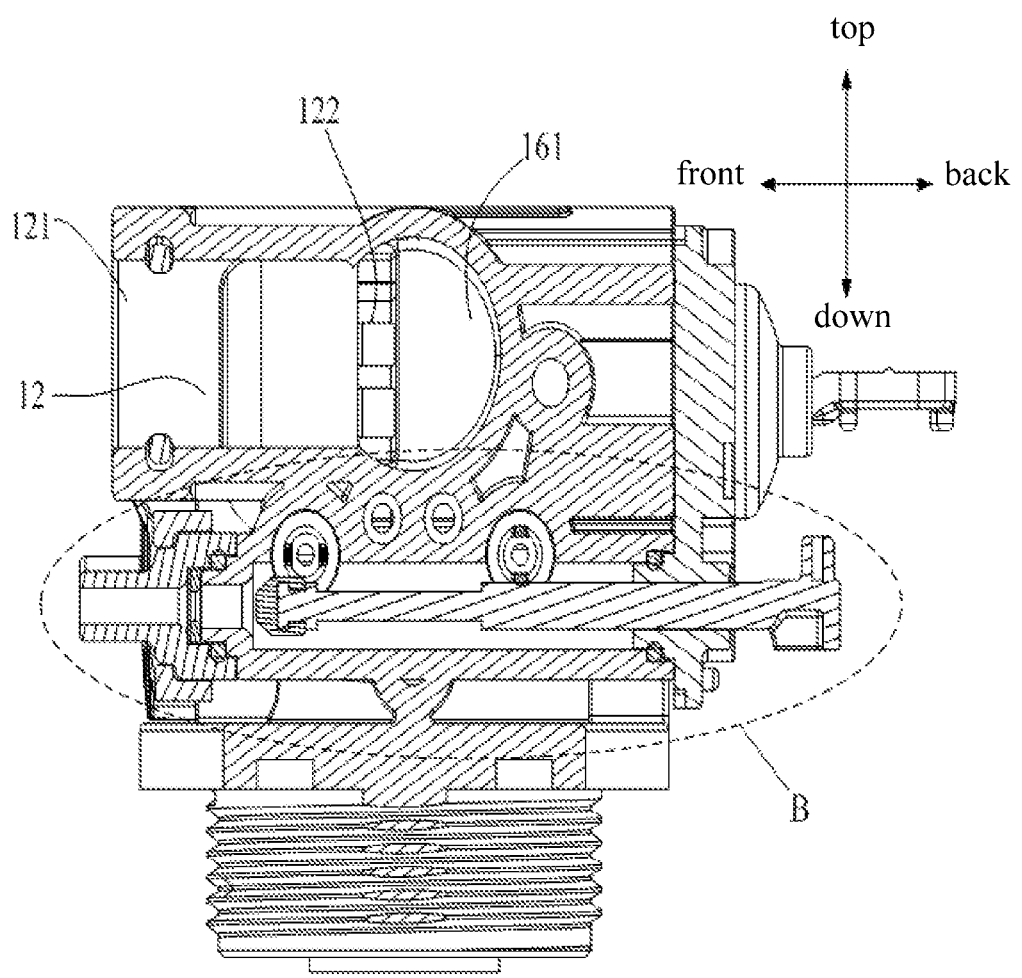
FIG. 9 is a cross section diagram along the line IX-IX shown in FIG. 8.
Figure 10:
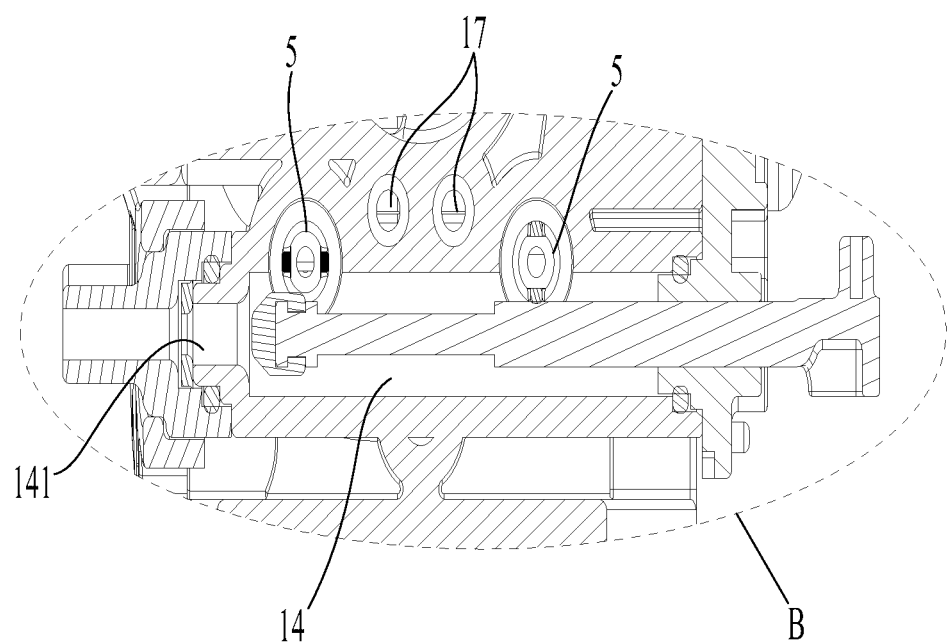
FIG. 10 is an exploded diagram of the portion B shown in FIG. 9.

Selectively, the ejector 5 is detachably mounted in the ejecting passage 18, the saline solution suction passage 14 communicates with the ejecting port of the ejector 5. when there are two pairs of the guiding passage 17 and the ejecting passage 18, and one pair of the guiding passage 17 and the ejecting passage 18 is used for forward washing, the other pair is used for backwashing, the water softener valve further includes a switch unit located on the connecting passage 41, the switch unit can be an electromagnetic valve, a manual knob can include a long plug 61 and a short plug 62 shown in FIG. 7, the second end cover 4 defines two holes for communicating with the two connecting passages 41.

Furthermore, referring to FIGS. 1-4, 11 and 13, the end of the valve cavity 10 away from the inlet 111 defines a mounting hole 101, the water softener valve further includes a third end cover 7 configured to cover the mounting hole 101.

In the exemplary embodiment, the valve cavity 10 can be formed by the draft process in the first direction, the spool component is mounted in the valve cavity 10 through the mounting port 101, the third cover 7 can not only cover the mounting port 101, but also limit the position of the spool component. A driving rod of the spool component can be exposed from the valve body 1 through the third cover 7, and the driving component can be mounted at the end of the water softener valve having the third end cover 7. By combining with the foregoing exemplary embodiments, each interface, such as, the inlet 111, the outlet 121, the waste water port 131, and the saline solution suction port 141, is the end of the water softener valve away from the third end cover 7, the arrangement is reasonable, so that the water softener valve takes up a small space.

Furthermore, referring to FIGS. 1-4, 11 and 15, the valve body further includes a softening inlet passage 19 and a softening outlet passage 20 which extend along the third direction, ends of the softening inlet passage 19 and the softening outlet passage 20 respectively defines a softening inlet 191 and a softening outlet 201.

In the exemplary embodiment, the water in the valve cavity 10 flows into the softening inlet passage 19 (softening input passage) through the spool component, the softening inlet passage 19 guides the water into a cavity containing an ion exchange filter material which can be softening resin. Water can be softened in the cavity, and softened water can flow into the softening outlet passage 20 (softening output passage) through the center pipe of the water softener, and finally flow out off the water softener through the valve cavity 10, therefore, user can use or store the softened water.

The softening inlet 191 and the softening outlet 201 are formed on the same end of the valve body 1 which is not the end of the valve body 1 having the inlet 111, the outlet 121, the waste water port 131, and the saline solution suction port 141, as such the valve body can be connected with the ion exchange tank of the water softener conveniently, and the inner space of the valve body 1 is reasonably arranged to reduce the volume of the water softener valve.

Furthermore, the end of the valve body 1 defining the inlet 111, the outlet 121, and the waste water port 131 defines a fourth auxiliary hole 21, the fourth auxiliary hole 21 is located between the waste water passage 13 and the saline solution suction passage 14.

The fourth auxiliary hole 21 extends along the first direction until communicates with the softening outlet passage 20, an inner surface of the fourth auxiliary hole 21 defines a fourth communicating port 211 communicated with the valve cavity 10; the water softener valve further includes a fourth end cover 8 configured to cover the fourth auxiliary hole 21.

In the exemplary embodiment, the fourth auxiliary hole 21 is configured to match with the fourth communicating port 211 formed by the draft process. The flow areas of the waste water passage 13 and the saline solution suction passage 14 are relatively small, the fourth auxiliary hole 21 is located between the waste water passage 13 and the saline solution suction passage 14, to make the structure of the front end of the valve body 1 is much more compacter, the valve body 1 takes up less space. The fourth end cover 8 covers the fourth auxiliary hole 21, the water in the cavity containing the ion exchange filter material can flow to the valve cavity 10 through the softening outlet passage 20 without leaking. In order to enforce the sealing effect, matching surfaces of the fourth end cover 8 and the valve body 1 define a sealing ring.

Figure 18:
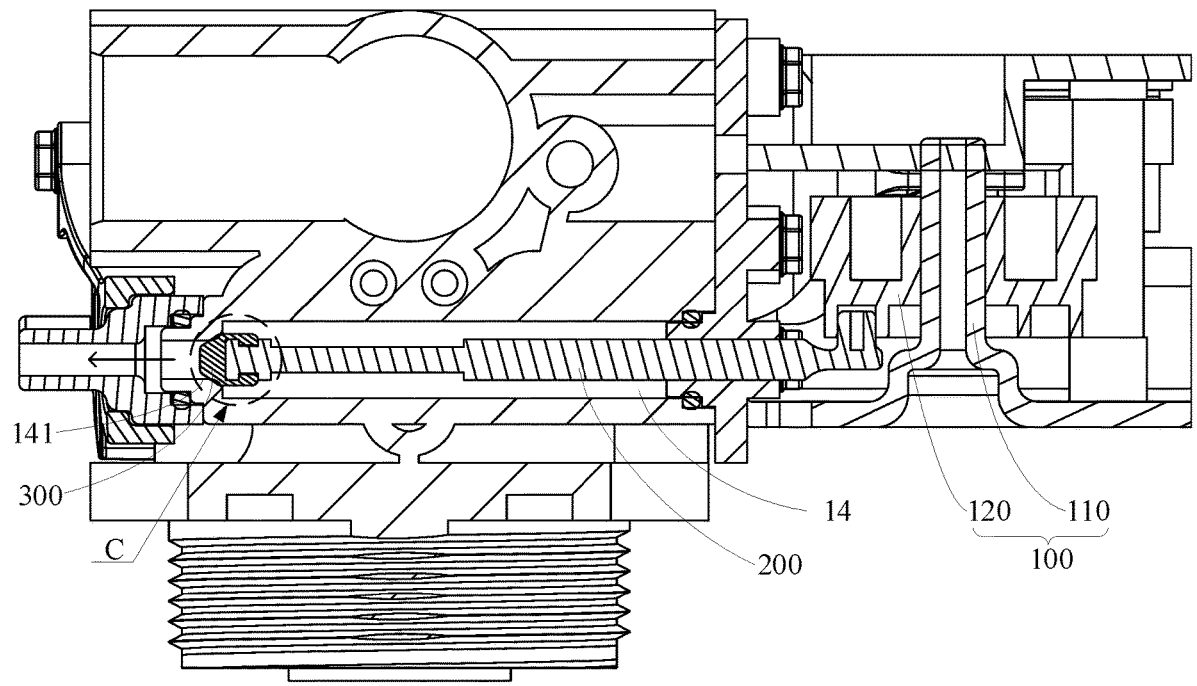
FIG. 18 is a structure diagram of the sealing structure of the water softener valve according to an exemplary embodiment of the present disclosure.
Figure 19:
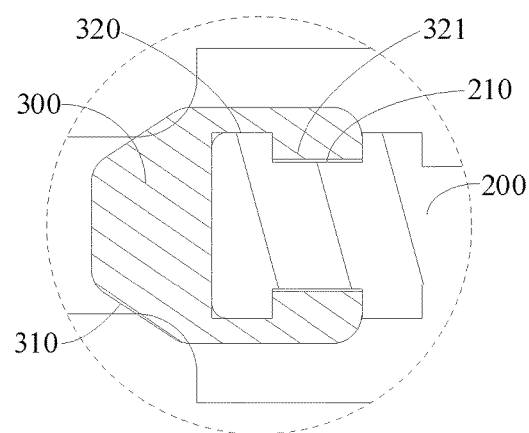
FIG. 19 is an exploded diagram of the portion C shown in FIG. 18.
Figure 20:
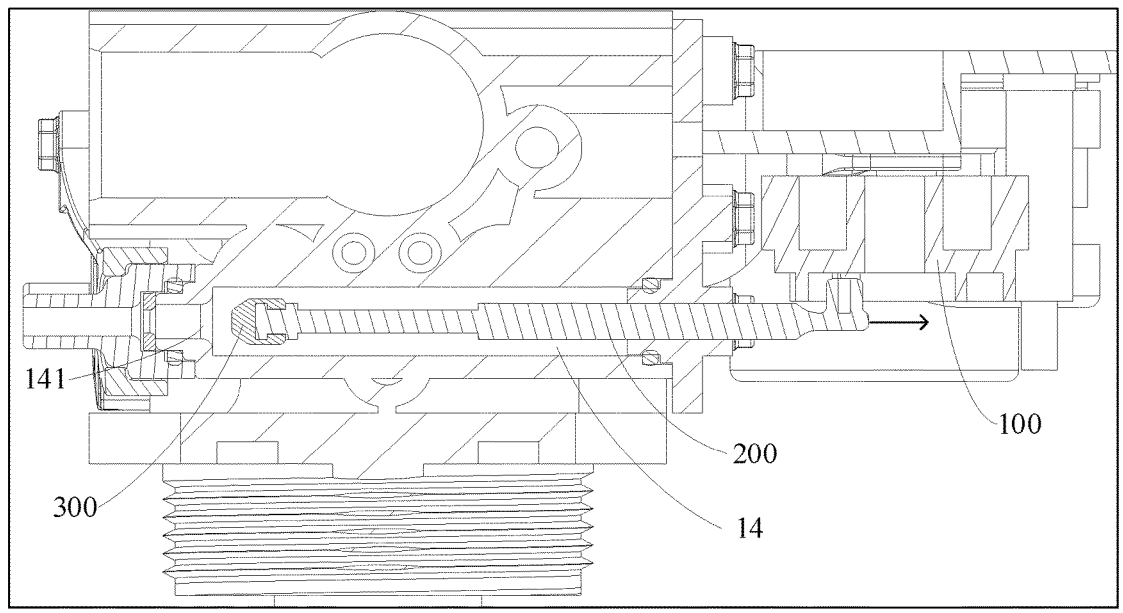
FIG. 20 is a structure diagram of the sealing structure of the water softener valve according to another exemplary embodiment of the present disclosure.
Figure 21:
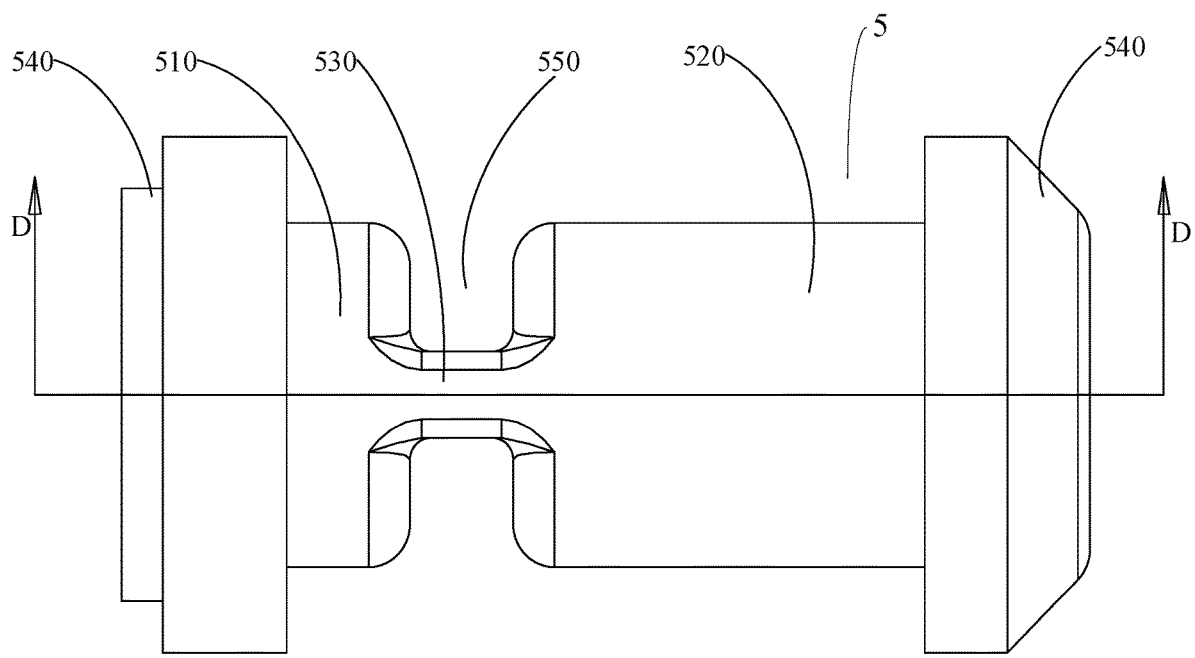
FIG. 21 is a front elevation view of the ejector of the present.
Figure 22:
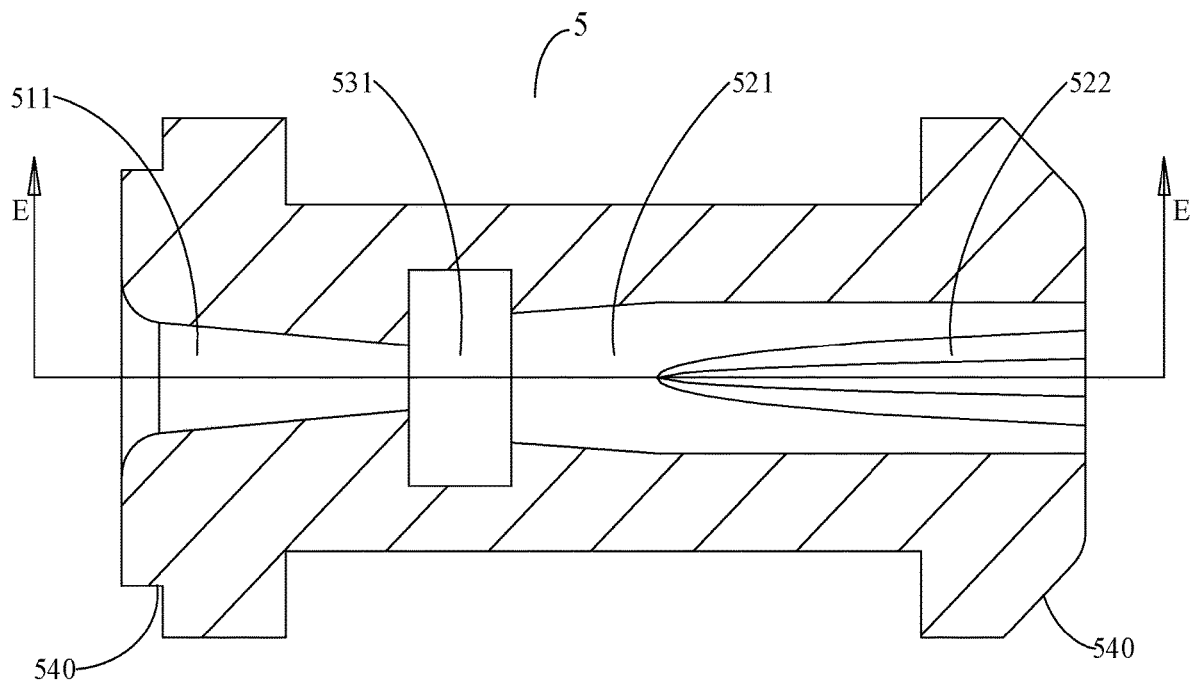
FIG. 22 is a cross section diagram along the direction D shown in FIG. 21.
Figure 23:
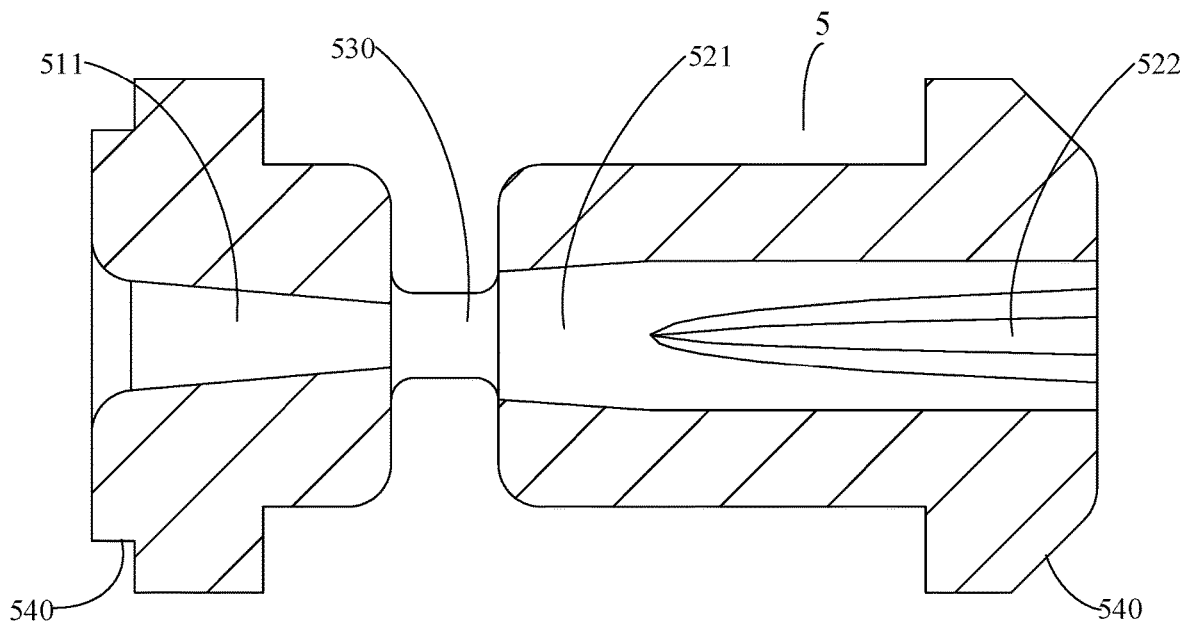
FIG. 23 is a cross section diagram along the direction E shown in FIG. 22.
Figure 24:
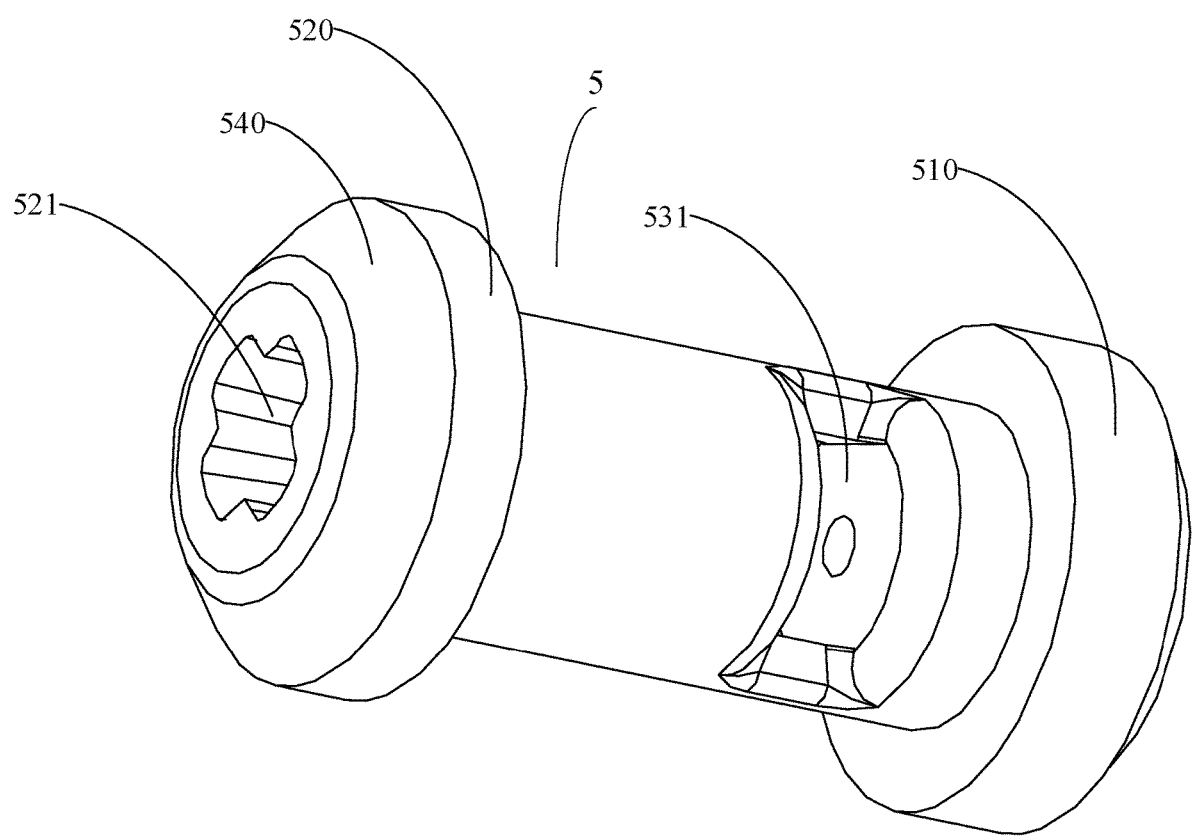
FIG. 24 is a first axial diagram of the ejector of the present disclosure.
Figure 25:
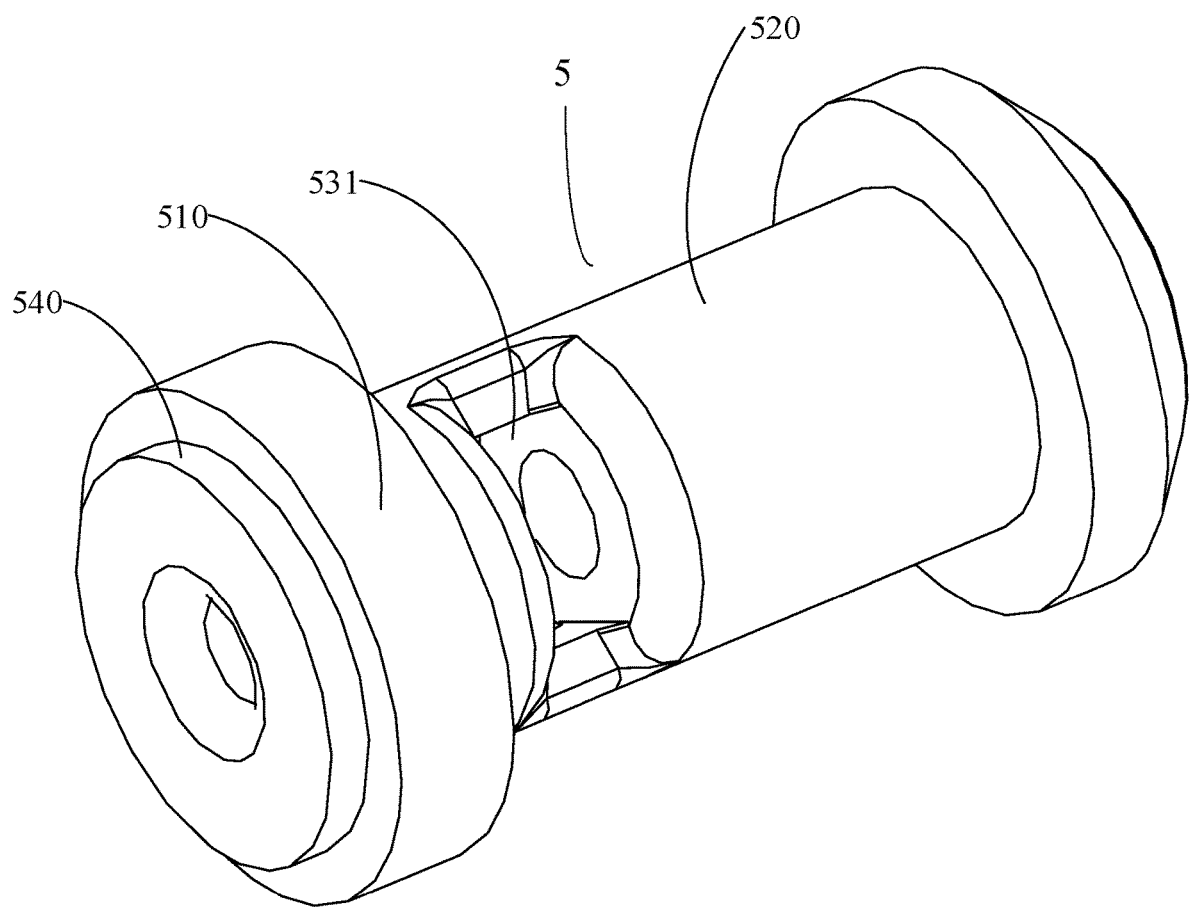
FIG. 25 is a second axial diagram of the ejector of the present disclosure.

In the exemplary embodiment of the present disclosure, referring to FIGS. 18-20, the water softener valve further includes a sealing structure, the sealing structure includes a driving component 100, a sealing plug 300, and a piston rod 200 located in the saline solution suction passage 14 of the water softener valve, one end of the piston rod 200 is connected with the driving component 100, the other end of the piston rod 200 is fixedly connected with the sealing plug 300; a shape of an outer surface of the sealing plug 300 matches with a shape of the saline solution suction port 141, and the outer surface of the sealing plug 300 is attached with a surface of the saline solution suction port 141; the driving component 100 drives the piston rod 200 to reciprocate, to allow the sealing plug 300 to seal or open the saline solution suction port 141. The sealing plug 300 is mainly used for matching with the saline solution suction 141, the shape of the outer surface of the sealing plug 300 matches with the shape of the saline solution suction port 141, as such the outer surface of the sealing plug 300 is attached with the surface of the saline solution suction port 141, to achieve the function of sealing the saline solution suction port 141 directly through the sealing plug 300. In an exemplary embodiment, the outer surface of the sealing plug 300 is attached with the inner surface of the saline solution suction port 141. When it needs to open the saline solution suction port 141, the piston rod 200 can drive the sealing plug 300 move toward the right direction (referring to the direction signs in the figures), when it needs to close the saline solution suction port 141, the piston rod 200 can drive the sealing plug 300 move toward the left direction (referring to the direction signs in the figures), to seal the saline solution suction port 141 through the sealing plug 300.

When the water softener works normally, running water flows into water softener valve through the inlet, and the calcium and magnesium in the running water is absorbed by resin, at this time, it does not need to inject the water and suck saline. And when the water softener works, the running water would pass the saline solution suction passage 14, the driving component drives the piston rod 200 move towards the left direction to make the sealing plug 300 seal the saline solution suction port 141, and the running water at the right side of the sealing plug 300 would generate a leftward pressure on the sealing plug 300, as such the saline solution suction port 141 can be sealed with the action of the sealing plug 300 and the water pressure.

When the resin absorbs the calcium-magnesium ion to the saturated state, it needs to wash the resin to remove the calcium-magnesium ion by the saline solution. At this time, the driving component 100 drives the piston rod 200 and the sealing plug 300 to move towards the right direction (not shown), to open the saline solution suction port 141, the salt particles can be mixed with water to form the saline solution, then the resin can be washed by the saline solution sucked through the saline solution suction port 141. After the resin is washed, the resin can be reused to absorb the calcium-magnesium ion in the water to soften the water.

In actual application process, the driving component 100 can be set according to the practical situation. The component which can drive the piston rod to reciprocally move can be used as the driving component 100, such as, the motor drives the cam to rotate, the motor drives connecting rod or the air cylinder or move, etc.

The driving component 100 of the present disclosure is connected with the piston rod 200, and the piston rod 200 is connected with the sealing plug 300, the driving component 100 drives the sealing plug 300 to move through the piston rod 200. The outer surface of the sealing plug 300 matches with the surface of the saline solution suction port 141, to seal the saline solution suction port 141. The driving component 100 drives the piston rod 200 to move, to bring the sealing plug 300 to close or open the saline solution suction port 141. When the saline solution suction port 141 is sealed by the sealing plug 300, the water pressure applied on the sealing plug 300 would also enforce the sealing effect, as such the saline solution suction port 141 can be sealed with the action of the sealing plug 300 and the water pressure.

Furthermore, referring to FIGS. 18-20, the side of the sealing plug 300 facing the saline solution suction port 141 defines a guiding bevel 310, the saline solution suction port 141 defines a chamfered surface corresponding to the guiding bevel, a slanting angle of the guiding bevel 310 equates with the slanting angle of the chamfered surface, the guiding bevel 310 resists on the chamfered surface. The guiding bevel 310 can make the process of the sealing plug 300 moving towards the left direction (referring to figures) to seal the saline solution suction port 141 much more smoothly, and the saline solution suction port 141 is chamfered, the slanting angle of the guiding bevel 310 equates with the slanting angle of the chamfered surface, a part of the guiding bevel 310 can extend into the saline solution suction port 141, to improve the sealing effect.

Furthermore, referring to FIG. 19, the sealing plug 300 is clamped with the piston rod 200. In actual application process, the connecting mode between the sealing plug 300 and the piston rod 200 can be selected according to the actual requirement, such as, bolting, clamping, or bonding, etc. In the exemplary embodiment, clamping the sealing plug 300 and the piston rod 200 is a preferable choice considering the factors, such as cost and processing technology, etc, the installation is much more convenient.

Furthermore, referring to FIG. 19, the side of the sealing plug 300 facing the piston rod 200 defines a first groove 320, the piston rod 200 is clamped in the first groove 320. The mode of the piston rod 200 clamping in the first groove 320 can be selected according to the actual requirement, such as, the piston rod 200 is tightly received in the first groove 320, or the piston rod 200 is received in the first groove 320, and clamped with a hook formed on the surface of the first groove 320, etc.

Selectively, the ends of the piston rod 200 adjacent to the sealing plug 300 defines a second groove 210; a wall of the first groove 320 is defined with a protrusion 321 protruding towards the piston rod 200, a shape of the protrusion 321 matches with a shape of the second groove 210, and the protrusion 321 is clamped in the second groove 210. As the shape of the protrusion 321 matches with the shape of the second groove 210, the protrusion 321 can be tightly clamped in the second groove 210, therefore, when the piston rod 200 moves, the piston rod 200 can bring the sealing plug 300 to move simultaneously.

Furthermore, the sealing plug 300 is made of plastic. When the saline solution suction port 141 is sealed by the sealing plug 300, as the sealing plug 300 is made of plastic material, the plastic material can make the sealing plug tightly connect to the saline solution suction port 141, to prevent the water from being leaked through a gap between the sealing plug 300 and the saline solution suction port 141. In actual application process, the material of the sealing plug 300 can be selected according to the requirement, such as, rubber, resin, silicone, etc. In the exemplary embodiment, ethylene-propylene-diene monomer (EPDM) is a preferable choice considering the factors, such as cost and durability, etc.

Furthermore, the piston rod is made of rigid material. The main function of the piston rod 200 is to bring the sealing plug 300 to seal or open the saline solution suction port 141, that is, the main function of the piston rod 200 is to drive, as such the piston rod 200 should be rigid, the force of the driving component 100 bring the piston rod 200 to move can be completely transferred to the sealing plug 300, the operation of controlling the sealing plug 300 can be much stabilized. As the water would pass through the saline solution suction passage 14 receiving the piston rod 200, so that the piston rod 200 is possibly made of rigid material, such as, stainless steel, alloy steel, etc.

Furthermore, referring to FIG. 18, the driving component 100 includes a driving motor 110, and a cam 120 connected with a driving shaft of the driving motor 110, the piston rod 200 is fixed on the cam 120. When the driving motor 110 works, the driving shaft rotates to bring the cam 120 to rotate, during the rotating process of the cam 120, the cam 120 brings the piston rod 200 to move according to a fixed track, as such the movement of the sealing plug 300 driven by the piston rod 200 is much more stabilized.

Referring to FIGS. 21-26, the water softener valve further includes a ejector 5, the ejector 5 includes: an inlet part 510, the inlet part 510 defines an inlet hole 511; an outlet part 520, the outlet part 520 defines an outlet hole 521, the outlet hole 521 and the inlet hole 511 are coaxing, an aperture of the inlet hole 511 is smaller than an aperture of the outlet hole 521, a free end of the outlet part 520 defines a sealing part 540 which sealing matches with a sealing ring 9 of the water softener valve, the sealing part 540 is detachably connected with the sealing ring 9; and a connecting part 530, the inlet part 510 and the outlet part 520 are respectively defined at two opposites ends of the connecting part 530, the connecting part 530 defines a saline solution suction hole 531, the inlet hole 511 communicates with the outlet hole 521 through the saline solution suction hole 531.

In detail, the ejector 5 includes the inlet part 510, the outlet part 520, and the connecting part 530, the inlet part 510 and the outlet part 520 are respectively mounted at two opposites ends of the connecting part 530, the connecting part 530 defines the saline solution suction hole 531, the inlet part 510 defines an inlet hole 511, the outlet hole 521 and the inlet hole 511 are both in the same axis, the inlet hole 511 is communicated with the outlet hole 521 through the saline solution suction hole 531, the aperture of the inlet hole 511 is smaller than the aperture of the outlet hole 521, making it is easy to generate a negative pressure when the water comes to the outlet hole 521 after passing through the inlet hole 511, and making the saline solution easily flows out of the valve body 1 through the saline solution suction hole 531 and the outlet hole 521 in sequence. The free end of the outlet part 520 defines a sealing part 540, when the ejector matches with the water softener valve, the sealing part 540 and the sealing ring 9 can be detachably pressed along the axis direction. When mounting the ejector 5 with the water softener valve, the sealing ring 9 is mounted first, then the ejector 5 is mounted. When it is need to change the ejector 5 along the axis direction, the ejector 5 can be automatically separated from the sealing ring 9, to avoid the sealing ring from rubbing the side of the receiving cavity of the water softener valve, to obtain the ejector 5 having the advantages of simple structure, easy to mount and change.

It is to be understood that, the sealing part 540 is an annular groove located at the free end of the outlet part 520 and matched with the sealing ring 9. The annular groove is formed at the end of the ejector 5, as such it is convenient to press the sealing ring to make the sealing ring 9 tightly receive in the annular groove along the axis direction when mounting the ejector 5 with the water softener valve. The sealing ring 9 is detachably mounted in the annular groove. The cross section of the annular groove along the axis direction can have a circular arc shape, a square shape, or a V-shape.

In the exemplary embodiment of the present disclosure, the free end of the outlet part 520 defines the sealing part 540, the sealing part 540 and the sealing ring 9 can be pressed along the axis direction when the ejector 5 is mounted with the water softener valve, to avoid the sealing ring 9 rubbing the side of the receiving cavity of the soft water cavity when embedding the sealing ring 9 in the side of the ejector 5, to obtain the ejector 5 having the advantages of simple structure, easy to mount and change.

Furthermore, the free end of the outlet part 520 also defines the sealing part 540. The free end of the outlet part 520 defines the sealing part 540 which can be easily mounted with the sealing ring 9. When the ejector 5 is mounted with the water softener valve, the sealing part 540 and the sealing ring 9 can be detachably pressed along the axis direction, making it is convenient to mount the ejector 5 with the water softener valve, and making it is also convenient to change the ejector 5. It is to be understood that, when the ejector 5 is mounted with the water softener valve, as the outlet part 520 is formed on the opening end of the receiving cavity of the water softener valve, as such the sealing ring 9 cooperated with the outlet part 520 can also be embedded in the side of the outlet part 520. When mounting the ejector 5 with the water softener valve, a section of the sealing ring 9 cooperated with the water softener valve is short, if the outlet part 520 also defines the sealing part 540, it is also convenient to mount the ejector 5 with the water softener valve. In the exemplary embodiment of the present disclosure, the free end of the outlet part 520 also defines the sealing part 540 which can be detachably connected with the sealing ring 9, the sealing ring 9 and the sealing part 540 can be pressed along the axis direction. On the basis of that the outlet part 520 defines the sealing part 540, making it is convenient to mount the ejector 5 with the water softener valve.

Furthermore, the sealing part 540 is gradually tapered along a direction away from the connecting part 530. The free end of the ejector 5 is gradually tapered along the direction away from the axis of the connecting part 530 to form the sealing part 540, the sealing part 540 is gradually tapered, as such it is easy to manufacture, and it is also easy to detachably press the sealing part 540 and the sealing ring 9 along the axis direction when mounting the ejector 5 with the water softener valve. It is to be understood that, the free end of the sealing part 540 of the ejector 5 can also have a circular arc shape, the circular arc shape matches with the sealing ring 9. In the exemplary embodiment of the present disclosure, the sealing part 540 is gradually tapered along the direction away from the connecting part 530, it is easy to manufacture the sealing part 540, and it is also easy to detachably press the sealing part 540 and the sealing ring 9 along the axis direction.

Furthermore, the sealing part 540 is an opening (not shown) formed on the free end of the ejector 5, the opening matches with the sealing ring 9. In the exemplary embodiment of the present disclosure, the outer periphery of the free end of the free end of the ejector 5 defines the opening, the opening matches with the sealing ring 9. As the opening is formed at the free end of the ejector 5, making it is easy to detachably press the sealing part 540 and the sealing ring 9 along the axis direction when mounting the sealing part 540 and the sealing ring 9, the structure of the ejector 5 is detachably connected with the water softener valve, as such it is easy to change the ejector 5 or water softener valve.

Furthermore, the inlet part 510, the outlet part 520, and the connecting part 530 are integrated together. It is to be understood that, the inlet part 510, the outlet part 520, and the connecting part 530 are detachably connected with each other. In the exemplary embodiment, as the inlet part 510, the outlet part 520, and the connecting part 530 are integrated together, the inlet part 510, the outlet part 520, and the connecting part 530 can be manufactured through one mold, to reduce the manufacture cost of the ejector 5. The connecting among the inlet part 510, the outlet part 520, and the connecting part 530 is strong and stable. When mounting the ejector 5 with the water softener valve, it only needs to place the ejector 5 on the water softener valve, or when separating the ejector 5 from the water softener valve to change the ejector 5, it only needs to take out the ejector 5, omitting the step of mounting the ejector 5, making it is convenient to mount ejector 5 with the soft water valve, also making it is convenient to change the ejector 5.

Furthermore, the inlet hole 511 is a taper hole which is gradually tapered along a direction towards the connecting part 530. The inlet hole 511 is the taper hole, and the inlet hole 511 is gradually tapered along the direction towards the connecting part 530. When the water passes the inlet hole 511, the pressure of the water increases, then when the water flows to the outlet hole 521 from the inlet hole 511, the water can easily generate the negative pressure, making it is easy to bring the saline solution flow to the outlet hole 521 from the saline solution suction hole 531. In the exemplary embodiment of the present disclosure, the inlet hole 511 has the taper shape, and the inlet hole 511 is gradually tapered along the direction towards the connecting part 530. The structure of the inlet hole 511 is simple, as such the inlet hole 511 is easily to be manufactured, the ejector 5 works normally, to take the saline solution away from the saline solution suction hole 531.

Furthermore, the inner surface of the outlet hole 521 defines a plurality of lugs 522 which are arranged uniformly. In the exemplary embodiment, the lugs 522 are uniformly formed on the inner surface of the outlet hole 521, the lugs 522 are configured to guide the water coming out of the outlet hole 521, the water flowing out of the outlet hole 521 can easily form the water passage under the action of the lugs 522, as such the water passing through the outlet hole 521 is mixed together and then stably flows out. The outlet hole 521 has a simple structure and is easily to be manufactured. The lugs 522 formed on the inner surface of the outlet hole 521 can ensure that the saline solution stably flows out of the ejector 5.

Furthermore, the inlet part 510, the outlet part 520, and the connecting part 530 cooperatively form two saline solution suction grooves 550, the opening directions of the saline solution suction grooves 550 are opposite, the saline solution suction hole 531 runs through the bottom of the saline solution suction grooves 550. The inlet part 510 and the outlet part 520 are located at two opposite ends of the connecting part 530, the inlet part 510, the outlet part 520, and the connecting part 530 cooperatively form two saline solution suction grooves 550 having opposite opening directions, the saline solution suction hole 531 runs through the bottom of the saline solution suction grooves 550. In the exemplary embodiment, the inlet part 510, the outlet part 520, and the connecting part 530 cooperatively form two saline solution suction grooves 550 having opposite opening directions, making the saline solution in the saline solution suction groove 550 can easily flow to the outlet hole 521 from the saline solution suction hole 531, the structures of the inlet part 510, the outlet part 520, the connecting part 530, and the saline solution suction grooves 550 are simple, and the ejector 5 can easily bring the saline solution to flow.

Figure 26:
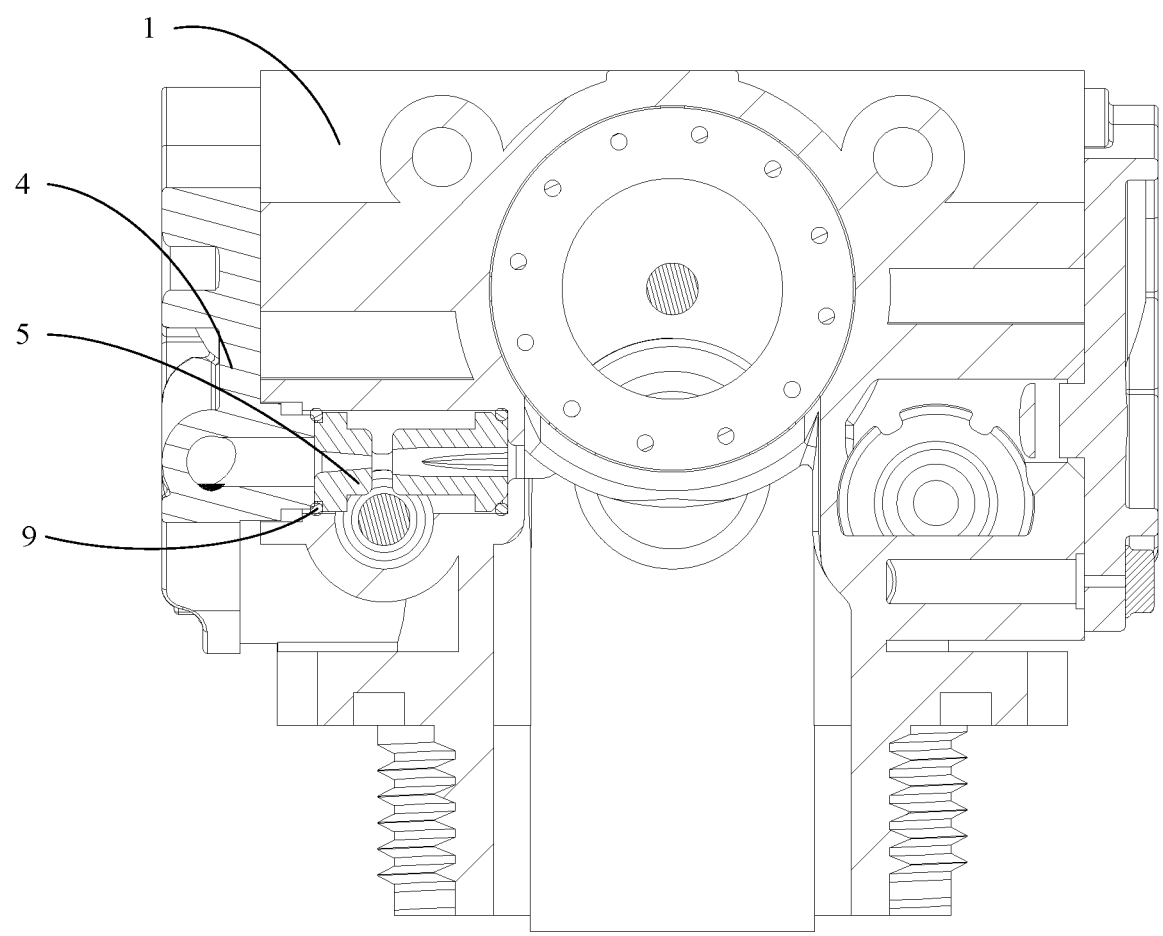
FIG. 26 is a cross section of the mounting part of the ejector and the water softener valve.

Referring to FIG. 26, the present disclosure also provides a water softener, which includes the ejector 5, a receiving cavity (not labelled) for receiving the ejector 5, and a second end cover 4. The second end cover 4 is detachably connected with the opening of the receiving cavity, the ejector 5 resists a sealing ring 9, and the ejector 5 and the sealing ring 9 are both received in the receiving cavity. During the process of mounting the ejector 5 and the water softener valve, the sealing ring 9 is located in the receiving cavity first, and the ejector 5 is placed in the receiving cavity, the ejector 5 can be compressed in the receiving cavity through the second end cover 4 and the sealing ring 9, the second end cover 4 is detachably connected with the opening of the receiving cavity, the ejector 5 resists the sealing ring 9 and compresses the sealing ring 9 along the axis direction, to match the ejector 5 with the water softener valve.

The detail structure of the ejector 5 can be referred to the above exemplary embodiments. As the water softener valve includes all technical proposals of all the exemplary embodiments, and the achieved technical effects are the same, no need to repeated again.

The present disclosure also provides a water softener, which includes an iron exchange tank, a saline solution tank, and a water softener valve. The detail structure of the water softener valve can be referred to the above description. As the water softener includes all technical proposals of all the exemplary embodiments, and the achieved technical effects are the same, no need to repeated again.

What is claimed is:

1. A water softener valve, comprising
a valve body and an ejector;
wherein the valve body comprising a valve cavity, an inlet passage, an outlet passage, and a waste water passage all communicated with the valve cavity;
wherein the valve cavity, the inlet passage, the outlet passage, and the waste water passage all extend along an identical first direction, the inlet passage, the outlet passage, and the waste water passage are all located at a periphery of the valve cavity, and adjacent to the valve cavity;
ends of the inlet passage, the outlet passage, and the waste water passage which are all located at a same end of the valve body respectively form an inlet, an outlet, and a waste water port;
wherein a spool component is provided in the valve cavity for controlling flow there-through;
wherein the ejector comprises:
an inlet part, the inlet part defines an inlet hole;
an outlet part, the outlet part defines an outlet hole, the outlet hole and the inlet hole are coaxial, an aperture of the inlet hole is smaller than an aperture of the outlet hole, a free end of the outlet part defines a sealing part which sealing matches with a sealing ring of the water softener valve, the sealing part is detachably connected with the sealing ring; and
a connecting part, the inlet part and the outlet part are respectively defined at two opposites ends of the connecting part, the connecting part defines a saline solution suction hole, the inlet hole communicates with the outlet hole through the saline solution suction hole.

2. The water softener valve according to claim 1, wherein the valve body further comprises a saline solution suction passage communicated with the valve cavity, the saline solution suction passage extends along the first direction and locates at the periphery of the valve cavity, the saline solution suction passage defines a saline solution suction port at the end of the valve body having the inlet, the outlet, and the waste water port.

3. The water softener valve according to claim 2, wherein the inlet, the outlet, the waste water port, and the saline solution suction port are all arranged along a second direction, the end of the inlet passage having the inlet, and the end of the outlet passage having the outlet are both protruded from the end of the waste water passage having the waste water port or the end of the saline solution suction passage having the saline solution suction port, the first direction is perpendicular to the second direction.

4. The water softener valve according to claim 3, wherein, the valve body comprises a first end surface perpendicular to the second direction, the inlet passage, and the waste water passage are both adjacent to the first end surface;
the first end surface forms a first auxiliary hole and a second auxiliary hole, the water softener valve further comprises a first end cover configured to cover the first auxiliary hole and the second auxiliary hole;
the first auxiliary hole communicates with the inlet passage, an inner surface of the inlet passage facing the first auxiliary hole defines a first communicating hole which communicates with the valve cavity; and
the second auxiliary hole communicates with the waste water passage, an inner surface of the waste water passage facing the second auxiliary hole defines a second communicating hole which communicates with the valve cavity.

5. The water softener valve according to claim 4, wherein,
the valve body further comprises a second end surface perpendicular to the second direction, the second end surface faces in a direction opposite to that of the first end surface, the outlet passage is adjacent to the second end surface; and
the second end surface defines a third auxiliary hole which communicates with the outlet passage, the water softener valve further comprises a second end cover configured to cover the third auxiliary hole, an inner surface of the outlet passage facing the third auxiliary hole defines a third communicating hole which communicates with the valve cavity.

6. The water softener valve according to claim 5, wherein the saline solution suction passage is adjacent to the second end surface, a guiding passage and an ejecting passage of the valve body are both defined in the second end surface, and extend along the second direction until communicate with the valve cavity, the second end cover defines a connecting passage configured to communicate with external ends of the guiding passage and the ejecting passage.

7. The water softener valve according to claim 3, wherein the end of the valve cavity away from the inlet defines a mounting hole, the water softener valve further comprises a third end cover configured to cover the mounting hole.

8. The water softener valve according to claim 3, wherein the valve body further comprises a softening inlet passage and a softening outlet passage which extend along the third direction, ends of the softening inlet passage and the softening outlet passage respectively defines a softening inlet and a softening outlet.

9. The water softener valve according to claim 8, wherein,
the end of the valve body defining the inlet, the outlet, and the waste water port defines a fourth auxiliary hole, the fourth auxiliary hole is located between the waste water passage and the saline solution suction passage;
the fourth auxiliary hole extends along the first direction until communicates with the softening outlet passage, an inner surface of the fourth auxiliary hole defines a fourth communicating port communicated with the valve cavity; the water softener valve further comprises a fourth end cover configured to cover the fourth auxiliary hole.

10. The water softener valve according to claim 2, wherein the water softener valve further comprises a sealing structure, the sealing structure comprises a driving component, a sealing plug, and a piston rod located in the saline solution suction passage of the water softener valve, one end of the piston rod is connected with the driving component, the other end of the piston rod is fixedly connected with the sealing plug; a shape of an outer surface of the sealing plug matches with a shape of the saline solution suction port, and the outer surface of the sealing plug seals with a wall surface of the saline solution suction port; the driving component drives the piston rod to reciprocate, to allow the sealing plug to seal or open the saline solution suction port.

11. The water softener valve according to claim 10, wherein the side of the sealing plug facing the saline solution suction port defines a guiding bevel, the saline solution suction port defines a chamfered surface corresponding to the guiding bevel, a slanting angle of the guiding bevel equates to the slanting angle of the chamfered surface, the guiding bevel contacts the chamfered surface.

12. The water softener valve according to claim 10, wherein the sealing plug is clamped with the piston rod.

13. The water softener valve according to claim 12, wherein the side of the sealing plug facing the piston rod defines a first groove, the piston rod is clamped in the first groove.

14. The water softener valve according to claim 13, wherein the end of the piston rod adjacent to the sealing plug defines a second groove; a wall of the first groove is defined with a protrusion protruding towards the piston rod, a shape of the protrusion matches with a shape of the second groove, and the protrusion is clamped in the second groove.

15. The water softener valve according to claim 1, wherein the inlet part, the outlet part, and the connecting part are integrated together.

16. The water softener valve according to claim 15, wherein the inlet hole is a taper hole which is gradually tapered along a direction towards the connecting part.

* * * * *